United States Patent
Monroe et al.

(10) Patent No.: US 11,752,818 B2
(45) Date of Patent: Sep. 12, 2023

(54) REAR RAILGEAR AND RAILGEAR PIN-OFF SYSTEMS

(71) Applicant: Diversified Metal Fabricators, Inc., Atlanta, GA (US)

(72) Inventors: Timothy Alwin Monroe, Atlanta, GA (US); Brian Jeffery Frankum, Atlanta, GA (US); Daniel Joseph Jachim, Atlanta, GA (US)

(73) Assignee: DIVERSIFIED METAL FABRICATORS, INC., Atlanta, GA (US)

(*) Notice: Subject to any disclaimer, the term of this patent is extended or adjusted under 35 U.S.C. 154(b) by 292 days.

(21) Appl. No.: 17/026,073

(22) Filed: Sep. 18, 2020

(65) Prior Publication Data

US 2021/0086574 A1 Mar. 25, 2021

Related U.S. Application Data

(60) Provisional application No. 62/903,134, filed on Sep. 20, 2019.

(51) Int. Cl.
*B60F 1/04* (2006.01)

(52) U.S. Cl.
CPC .......... *B60F 1/043* (2013.01); *B60F 2301/00* (2013.01); *B60F 2301/10* (2013.01)

(58) Field of Classification Search
CPC .... B60F 1/00; B60F 1/005; B60F 1/04; B60F 1/043; B60F 2301/00; B60F 2301/04; B60F 2301/10; B61D 15/00
See application file for complete search history.

(56) References Cited

U.S. PATENT DOCUMENTS

| | | | | |
|---|---|---|---|---|
| 4,583,465 | A * | 4/1986 | Powell, Sr. ............. | B60F 1/043 105/215.1 |
| 6,298,792 | B1 * | 10/2001 | Jackson, Jr. ............ | B60F 1/043 105/215.1 |
| 9,873,441 | B1 * | 1/2018 | Bloom ................ | G01M 5/0058 |
| 2017/0151847 | A1 * | 6/2017 | Letukas .................... | B60F 1/04 |
| 2018/0370309 | A1 * | 12/2018 | Hazrati-Ashtiani ...... | B60F 1/02 |
| 2019/0263205 | A1 * | 8/2019 | Mascola ................. | B60F 1/043 |

* cited by examiner

*Primary Examiner* — Zachary L Kuhfuss
*Assistant Examiner* — Cheng Lin
(74) *Attorney, Agent, or Firm* — Thomas|Horstemeyer, LLP

(57) ABSTRACT

Disclosed are various embodiments for rear railgear, pivot links, and pin-off systems. An example assembly including railgear, an attachment frame, a mounting bracket, upper and lower links is provided. The rail gear includes a pair of guidewheels, an axle, and an axle saddle; the attachment frame can connect to the axle saddle of the railgear; the mounting bracket is configured to attach to a vehicle; the upper link pivotably connected to the mounting bracket; and the lower link pivotably connected to the attachment frame, where the lower link is connected to the upper link via a pivot pin. The railgear can be secured in either the deployed or stowed position using various interchangeable pin-off systems, including but not limited to: a manual pin-off system, an air operated pin-off system, and a cable pin-off system. The railgear can also be secured in the stowed position using an automatic mechanical lock system.

15 Claims, 18 Drawing Sheets

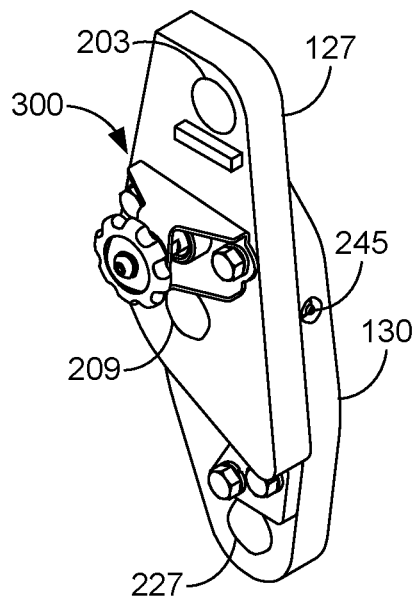 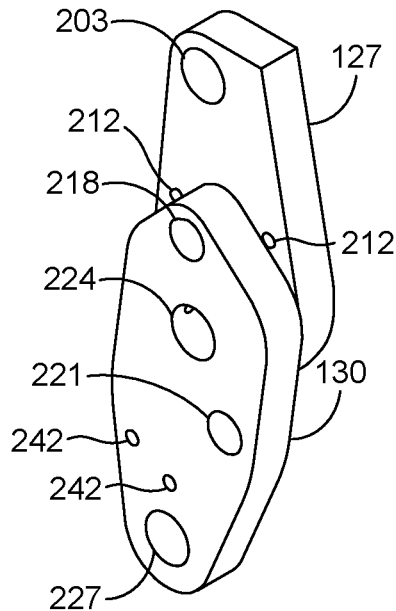
FIG. 4A   FIG. 4B
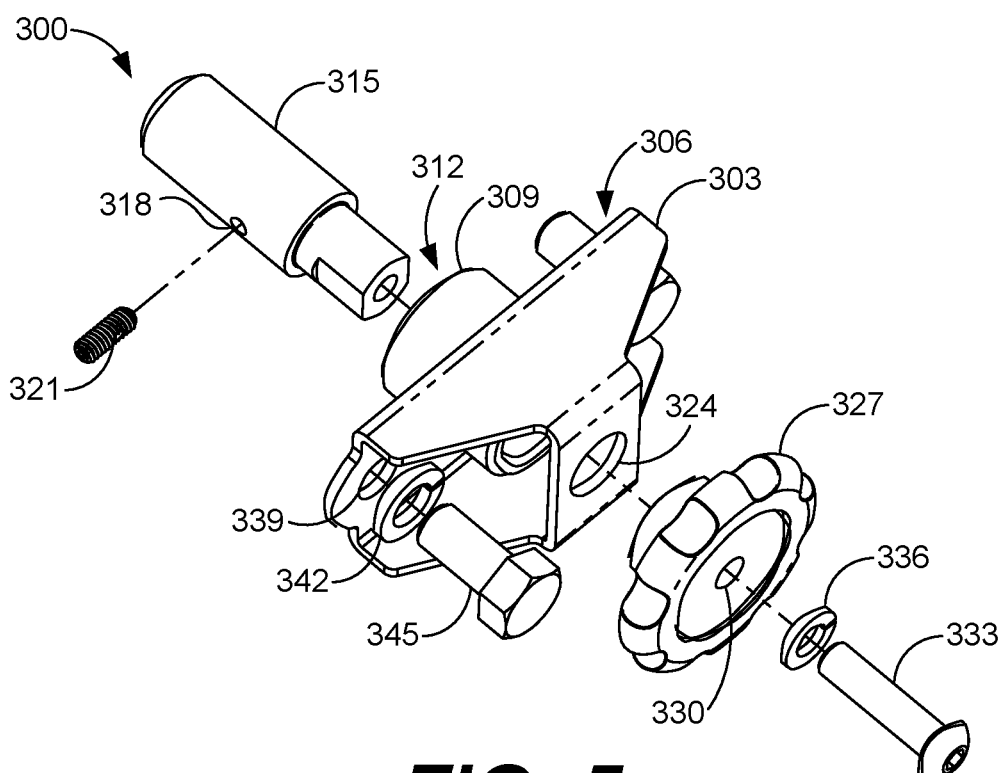
FIG. 5

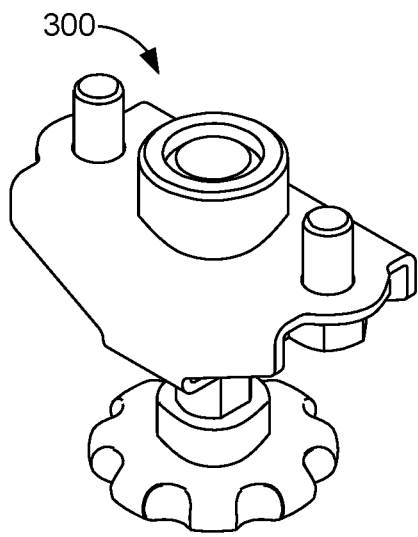
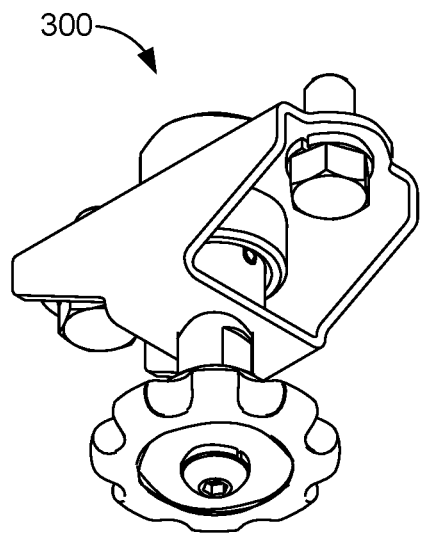
FIG. 6A    FIG. 6B
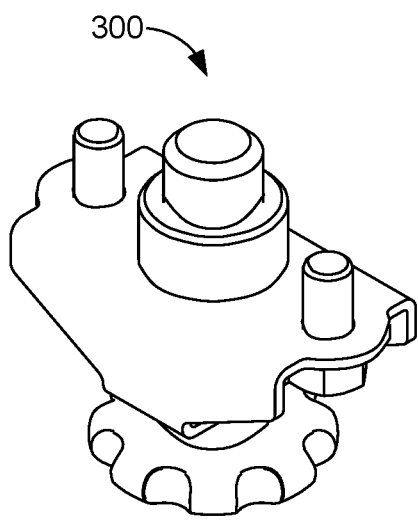
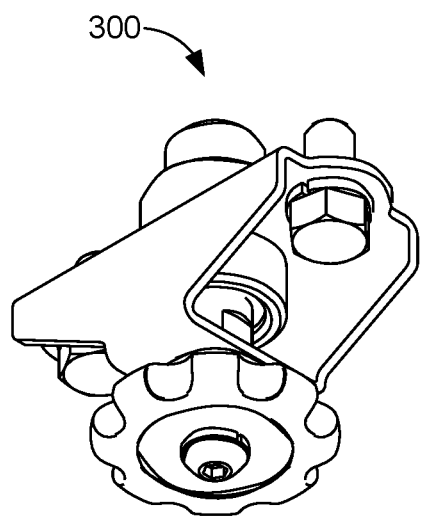
FIG. 7A    FIG. 7B

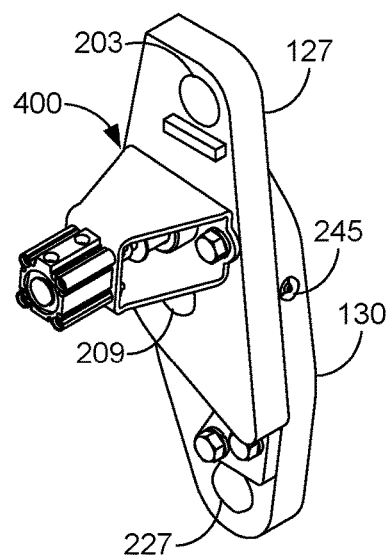
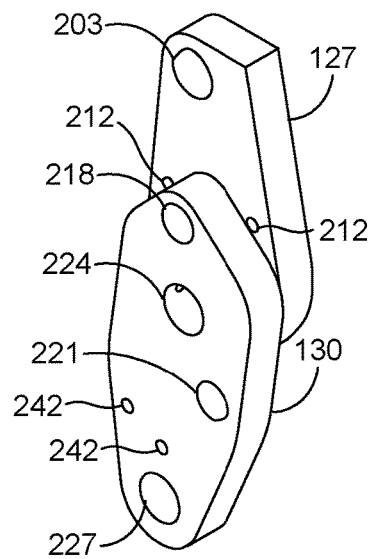
FIG. 9A  FIG. 9B
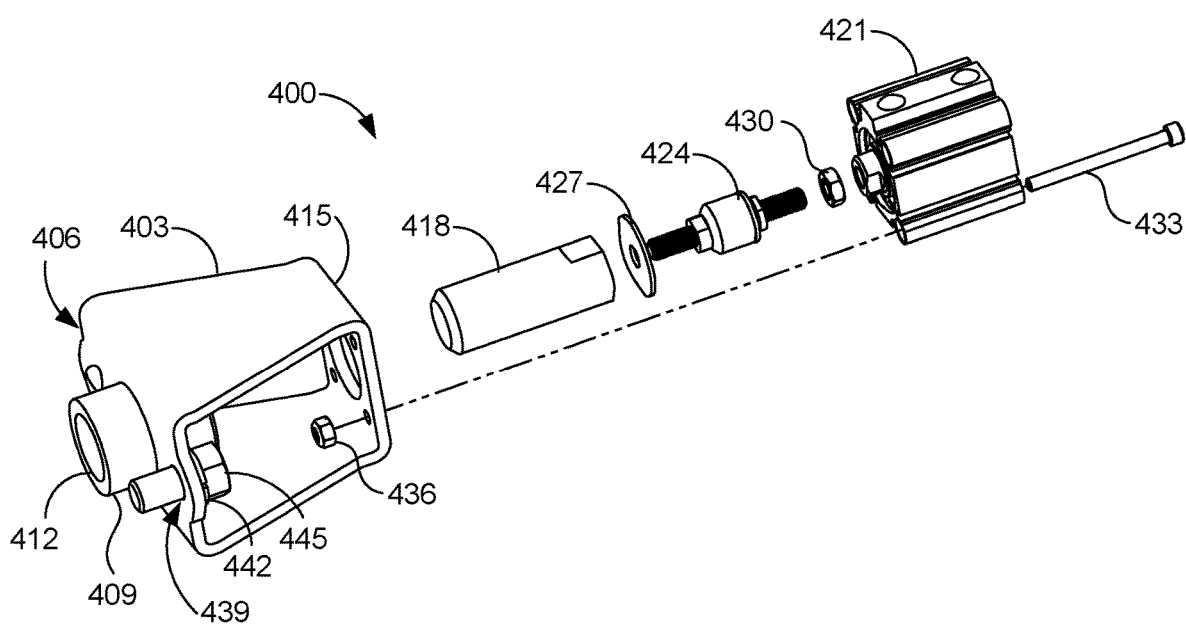
FIG. 10

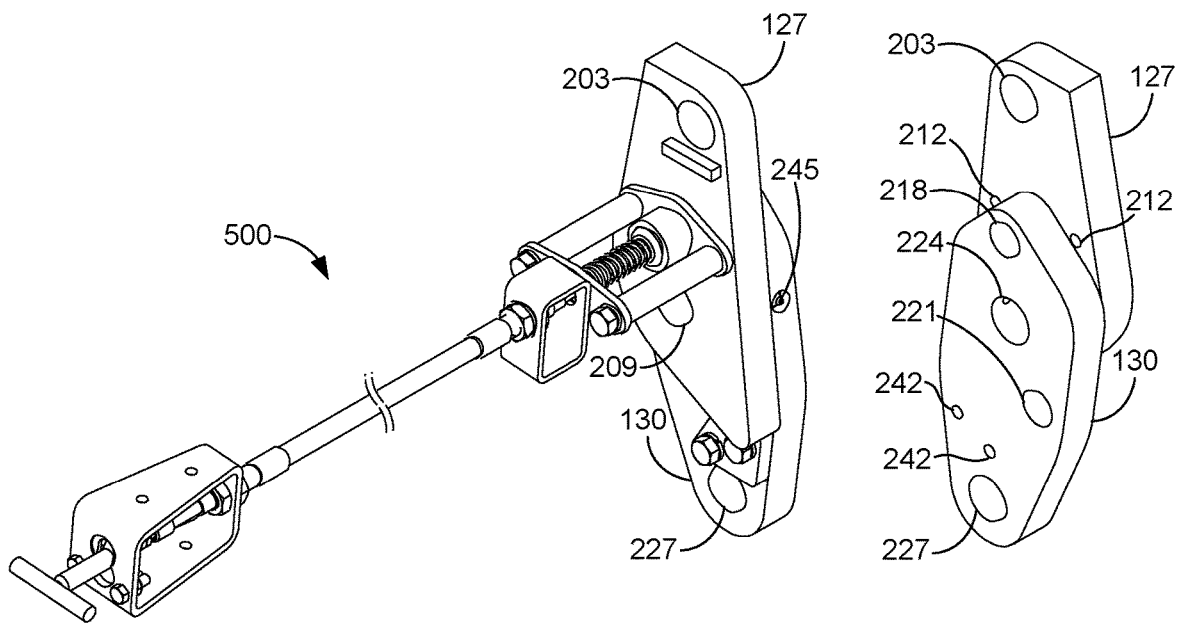
FIG. 14A  FIG. 14B
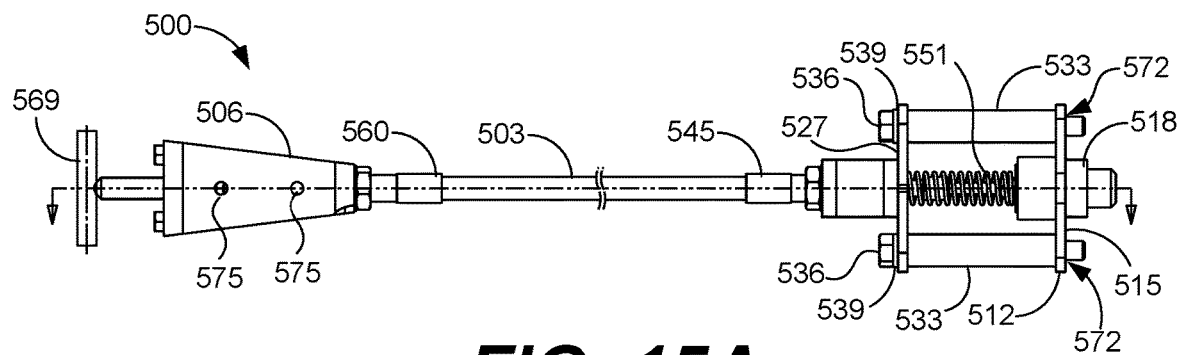
FIG. 15A
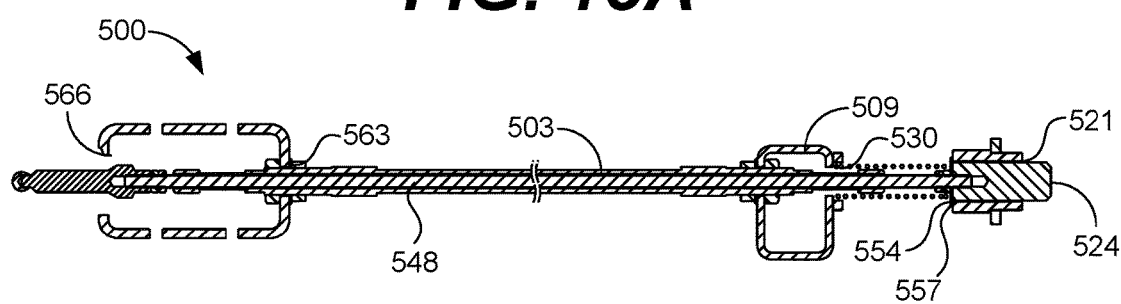
FIG. 15B

REAR RAILGEAR AND RAILGEAR PIN-OFF SYSTEMS

CROSS-REFERENCE TO RELATED APPLICATION

This application claims the benefit of U.S. Provisional Patent Application No. 62/903,134, filed Sep. 20, 2019, which is entirely incorporated herein by reference.

TECHNICAL FIELD

The present disclosure generally relates to railgear, in particular railgear for a road vehicle.

BACKGROUND

A conventional road vehicle, designed to travel on roads or highways, can be adapted with front and rear guide wheel assemblies to convert for use on a railway. Such vehicles, sometimes called road-rail or hi-rail vehicles, are equipped with both conventional tires to operate on roads and railgear with rail guide wheels to operate on railroad tracks. Depending on the mode of use, the railgear can be stowed in a raised position for vehicle use on the roadway or lowered to engage and for use on the railway.

SUMMARY

The present disclosure is directed towards rear railgear and railgear pin-off systems. For example, front and rear guide wheel assemblies, also known as railgear assemblies, can be attached to a conventional road vehicle, designed to travel on roads, highways, or other substantially flat surfaces to convert the road vehicle for use on a railway. Such a vehicle may be embodied in the form of, for example but not limited to, a truck, a pickup truck, a car, a van, a bus, a tractor, a trailer, a backhoe, a bulldozer, a crawler, or any other type of machinery to which the railgear may be attached to facilitate the machinery traveling along the railway. An assembly comprised of guide wheels attached to a separate axle than the existing vehicle axle may be also referred to as railgear, rail wheels, or hi-rail gear. The railgear can be deployed by lowering or extending downwardly the guide wheels for use on the railway or stowed by raising or retracting the guide wheels so they will not interfere with the operation of the vehicle when using its conventional tires on a roadway. The two positions of the railgear are sometimes referred to as rail mode or highway mode, respectively.

A guide wheel assembly can be configured with a pivoting linking portion to secure a portion of the guide wheel assembly to a vehicle (such as a vehicle described herein) and such that the guide wheel portion that can be extended or retracted for rail mode or highway mode, respectively. A linking portion for a front guide wheel assembly may be different than a rear guide wheel assembly. For example, a front guide wheel assembly may be configured to attach to the frame and front axle of the vehicle to lift the front wheels of the vehicle off the track and may require an extension for installation. Whereas, a rear guide wheel assembly may be configured to attach or be secured directly to the frame of the vehicle, for example, behind the rear axle or tandem spring hangers of the vehicle. For example, the railgear assembly can attach to the back end of a large truck, just behind the rear truck tires. The present railgear can deploy with an articulating dual scissor action that allows the rear railgear to be moved both vertically and horizontally. This mechanism provides a "side shift" action which allows operators a greater margin for aligning the vehicle to the track, thus speeding and simplifying the process of getting the vehicle on rail.

The rail wheels guide the truck down the railroad tracks, while the truck tires provide traction to accelerate and stop. It is advantageous for a rear guide wheel assembly to be configured to fit within the existing boundaries of the vehicle, thus a linking portion different from a front guide wheel assembly may be needed. Similarly, the front and rear railgear may have different pin-off systems. When deployed or extended the front and rear guide wheel assemblies engage the tracks of the railway and lift the front wheels of the vehicle off the track, thus, utilizing the vehicle's front suspension. When used in conjunction with a rear guide wheel assembly, the front railgear supports the vehicle and helps the vehicle navigate curves smoothly and dampen out the effects of track irregularities.

In accordance with a non-limiting example of the present disclosure, pivoting links can be incorporated into a rear guide wheel assembly configured for use with conventional roadway vehicles, such as pickup trucks, large trucks, utility vehicles, and the like. Railgear can be configured in a variety of sizes and load capacities depending on the vehicle, equipment, or application. For example, railgear can be designed for a vehicle with a gross vehicle weight rating (GVWR) of 33,000 lbs and above. The structural members and brackets of the guide wheel assembly can be constructed of carbon steel or other suitable material. The guide wheels can be machined from hardened steel castings or forgings and fitted to high strength alloy steel axles with heavy-duty tapered roller bearings.

The present railgear can be deployed for use on the railway or retracted and stowed for vehicle use on the roadway. For example, a rear guide wheel assembly can comprise at least one pair of links configured to hold the railgear and move or pivot between a stowed (retracted) position and deployed (extended) position. In some examples, the movement between the two positions can be assisted with a hydraulic actuator. As such, it is advantageous to secure the railgear in a fixed orientation, either deployed for rail travel using the guide wheels on rail tracks or stowed for highway travel such that the vehicle can operate using the conventional tires on a road, highway, and the like.

To secure railgear in a stowed position a pin-off or lock can be used. Conventional railgear can allow options for the pin-off or lock, however, it is often welded to the assembly for a particular configuration. Prior attempts at an automatic mechanical lock have utilized a gated mechanism that has concerns about added costs and complexity and suffers reliability, durability and engagement issues.

Further, in order to fit within the existing boundaries of the vehicle, the linking portion for the rear guide wheel assembly can have various configurations to meet the specifications of a particular vehicle. For example, a stationary link, or upper link, attached to the portion of the assembly installed on the vehicle can be paired with a pivot link, or lower link, connected to the railgear. The pair of links, upper (stationary) and lower (pivoting), can be specified as extra-short, short, or long depending on the size needed for a particular vehicle. As such, the sizes cannot be mixed between the upper and lower links. Optionally, the links may also include a slotted version to accommodate certain vehicles. This requires a large variety of link sizes and linking pairs.

The present system overcomes the aforementioned disadvantages. It provides a rear railgear system, linking system, and locking systems for railgear at a lower cost, at less complexity, that is more reliable and that solves engagement issues. The linking system and railgear attachment system can provide a universal design to accommodate a range of vehicle sizes without the need to specify the linking pairs. Also, the pin-off systems described herein have an interchangeable bolt on design instead of a specific weldment. However, the linking system and railgear attachment system can also include a weldment for a locking system.

In an embodiment, a system is provided for securing railgear to a vehicle, such as a vehicle describe herein. The system can comprise: an upper link comprising a mounting hole and an upper link pivot hole, the upper link pivotably connected to a mounting bracket with a mounting pin via the mounting hole, the mounting bracket comprising a mounting plate having a top and bottom surface; and a lower link comprising an attachment hole and a lower link pivot hole, the lower link pivotably connected to a frame with an attachment pin via the attachment hole; and an actuator comprising an actuator body and an arm, the arm configured to extend from and recede into the actuator body, the arm comprising a mounting pin at a free end, the actuator body comprising a pivot pin configured to be received in the lower link pivot hole and the upper link pivot hole to pivotably connect the upper link and the lower link, the actuator arm pivotably connected to the frame via the mounting pin, the actuator configured to move the frame from a first position to a second position relative to the mounting bracket, wherein the upper link rotates about the mounting pin from a first position to a second position of the upper link and the lower link rotates about the attachment pin from a first position to a second position of the lower link. The mounting bracket can be configured to be secured to a vehicle. The frame can be configured to be secured to railgear. The railgear can comprise opposed guide wheels, an axle, and axle saddles, with each axle saddle having a saddle hole which extends through the axle saddle.

In any one or more aspects of the system, the upper link can comprise a plate with a first and a second facing surface, the plate shaped with a first flat edge configured to abut the bottom surface of the mounting plate when the upper link is in the first position. The lower link can comprise a stop mounted on a first facing surface of the lower link, the stop comprising: a first position stop surface configured to engage a second flat edge of the upper link to stop movement of the upper link when the upper link is in the first position; a second position stop surface configured to engage a third flat edge of the upper link when the upper link is in the second position; and a rotation stop surface configured to abut a surface of the attachment pin extending outwardly from the attachment hole of the lower link. The mounting bracket can comprise a mounting tube secured to or into the bottom surface of the mounting plate, the upper link connected to the mounting bracket via the mounting tube. The frame can comprise an attachment plate, the attachment plate comprising an actuator mounting hole and a lower link mounting hole, the actuator mounting hole configured to receive the mounting pin of the actuator arm, the lower link mounting hole configured to receive the attachment pin to pivotably secure the lower link to the frame via the attachment hole of the lower link. The attachment plate can be a first attachment plate and the frame can further comprise a second attachment plate, a first and second side plate, and a bottom plate, wherein the first and second attachment plates are positioned spaced apart in parallel, the first and second side plates are positioned in parallel at opposite ends of the first and second attachment plates forming walls of the frame. The upper link can be a first upper link and the lower link can be a first lower link. The system can further comprise: an actuator having first and second pivot arms extending in opposing directions, each pivot arm being the pivot pin on a first and second side of the actuator; a second lower link, wherein the first and second lower links are pivotably mounted on the first and second pivot arms of the actuator, respectively; and a second upper link, wherein the first and second upper links are mounted on the first and second pivot arms of the actuator positioned such that the first and second lower links are between the first and second upper links and the actuator. The upper link can have a through hole to receive a member of a locking mechanism (which member can be a detent, such as a movable ball or pin), and the lower link can have a first and second seat to receive the member of the locking mechanism, the first seat configured to hold the frame in a first position, the second seat configured to hold the frame in a second position.

In an embodiment, a rear guide wheel assembly is provided. The rear guide wheel assembly can comprise: a railgear comprising a pair of guidewheels, an axle, and a first and a second axle saddle block attached at opposite ends of the axle; an attachment frame configured to connect to the axle saddle blocks of the railgear; a mounting bracket configured to attach to a vehicle; a plurality of upper links pivotably connected to the mounting bracket; a plurality of lower links pivotably connected to the attachment frame; and at least two independent actuators configured to facilitate movement of the railgear between a deployed position and stowed position, each actuator having a pair of pivot arms extending in opposing directions, said lower links connected to said upper links via said pivot arms.

In any one or more aspects of the rear guide wheel assembly each upper link can comprise a plate with a first and a second facing surface, the plate shaped with a first flat edge configured to abut a bottom surface of the mounting bracket when the upper link is in the first position, wherein the lower link further comprises a stop mounted on a first facing surface of the lower link, the stop comprising: a first position stop surface configured to engage a second flat edge of the upper link to stop movement of the upper link when the upper link is in the first position; a second position stop surface engage a third flat edge of the upper link when the upper link is in the second position; and a rotation stop surface configured to abut a surface of the attachment pin extending from the attachment pin positioned in the attachment hole of the lower link. The mounting bracket can comprise a mounting plate, a first and second mounting tube, and a first and second support plate, the mounting plate comprising a top and bottom surface, the first mounting tube attached to the bottom surface at a first end portion of the mounting plate, the second mounting tube attached to the bottom surface at a second end portion of the mounting plate, and the first support plate attached to the top surface of the mounting plate spaced apart from and facing the second support plate, the first and second support plates configured to receive fasteners to secure the rear guide wheel assembly to the vehicle. The attachment frame can comprise a first and second attachment plate, a first and second side plate, and a bottom plate, wherein the first and second attachment plates are positioned spaced apart in parallel, the first and second side plates are positioned in parallel at opposite ends of the first and second attachment plates forming walls of the attachment frame, wherein the attachment frame is configured fit over the first and second axle saddle blocks. Each attachment plate of the attachment frame can have a set of first and second position holes aligned vertically at opposite end portions of each attachment plate. Each axle saddle block can have a saddle hole which extends through said axle saddle block, the saddle hole configured to receive a positioning pin to connect the railgear to the attachment frame through the set of first position holes or the set of second positions holes. Each of the upper links can have a through hole to receive a locking mechanism having a locking member, for example a detent, such as a movable ball or pin, and each of the lower links can have a first and second seat to receive the locking member of the locking mechanism, the first seat configured to hold the railgear in the deployed position, the second seat configured to hold the railgear in the stowed position. The at least two independent actuators can comprise a first and a second actuator, wherein the first actuator actuates at a first speed and the second actuator actuates at a second speed such that the railgear is configured to be shifted off-center between the first and second position and is configured to be centered when reaching the second position.

In any one or more of the foregoing aspects, the rear guide wheel assembly can include: an upper locking device attached to the mounting bracket, the upper locking device comprising: a detent box tube comprising a plurality of side walls and a first and second box cap positioned at a first and second end of the detent box tube, each of the first and second box cap comprising a center aperture configured to receive a detent catch, the detent catch comprising a detent head and a detent seat, the detent catch positioned in the center aperture of each of the first and second box cap such that the detent seat faces an interior of the detent box tube and the detent catch is secured at the detent head on an exterior surface of each of the first and second detent box caps with an anti-rotation plate, the detent seats of attached to the first and second detent box cap are positioned facing each other; and a lower locking device attached to the frame, the lower locking device comprising: a first seat tube comprising a first end portion with a first diameter and a second end portion with a second diameter, the first seat tube being hollow and configured to contain at least a first detent, or locking member, and a first spring, the spring configured to apply pressure to the first detent such that the first detent protrudes from a first tube rim in a first end of the first seat tube; a second seat tube comprising a first end portion with a third diameter and a second end portion with the second diameter, the second seat tube being hollow and configured to contain at least a second detent, or locking member, and a second spring, the second spring configured to apply pressure to the second detent such that the second detent protrudes from a second tube rim in a first end of the second seat tube; a joint connector having an interior diameter configured to receive the second end portion of the first seat tube and the second end portion of the second seat tube; and a shaft collar, wherein the attachment frame can include a first and a second attachment plate, each of the first and second attachment plates having an interior and exterior surface, each of the first and second attachment plates comprise a large hole and a small hole; the first attachment plate arranged parallel to the second attachment plate such that the interior surfaces are facing each other and the large hole on the first attachment plate is aligned with the small hole of the second attachment plate, and wherein the lower locking device is configured to be received in the attachment frame such that the first portion of the first seat tube passes through the large hole of the first attachment plate to be seated from the interior in the small hole of the second attachment plate and the first end portion of the second seat tube is seated in the large hole of the first attachment plate, the lower locking device secured in position by the shaft collar.

In any one or more aspects of any one or more embodiments herein, the locking mechanism can be a manual pin-off system. The manual pin-off system can comprise: a base having a portion configured to abut the first surface of the upper link; a member, for example a cylindrical portion, extending from the portion of the base, the member having an aperture, such as a center aperture, to receive a manual pin-off pin, the member configured to be received in the through hole of the upper link with a tight fit; and a knob opposite the portion of the base, the base having an aperture configured to receive a stem of the knob, wherein the manual pin-off pin is configured to be deployed by pushing the knob, the manual pin-off pin being received in the first seat or the second seat of the lower link.

In any one or more aspects of any one or more embodiments herein, the locking mechanism can be an air operated pin-off system. The air operated pin-off system can comprise: a base having a portion configured to abut the first surface of the upper link; a member, for example a cylindrical portion, extending from the portion of the base, the member having an aperture, such as a center aperture, to receive an air pin-off pin, the member configured to be received in the through hole of the upper link with a tight fit; and an air cylinder with an inline joint, for example a ball joint, wherein the air operated pin-off pin is operated by the air cylinder, the air pin-off pin being received in the first seat or the second seat of the lower link.

In any one or more aspects of any one or more embodiments herein, the locking mechanism can be a cable pin-off system. The cable pin-off system can comprise: a mount assembly comprising a cable pin-off base having a base and a portion of the base configured to abut the first surface of the upper link, a member, for example a cylindrical member, extending from the portion of the base, the member having an aperture, for example a center aperture, the member configured to be received in through hole of the upper link; a cable mounting tube including a handle; a cable bulkhead extending from the cable mounting tube to the mount assembly; and wherein the cable pin-off pin is operated by the cable, the cable pin-off pin being received in the first seat or the second seat of the lower link.

In any one or more aspects of any one or more embodiments herein, the locking mechanism can comprise an automatic mechanical lock, the automatic mechanical lock comprising an upper lock device and a lower lock device, the upper lock device attached to the bottom surface of the mounting plate, the lower lock device attached to the frame, the upper lock device configured to receive the lower lock device and at least a portion of the frame.

In any one or more aspects of any one or more of the embodiments, the saddle hole 145 provided in the axle saddle 142 can be an elongated hole, eliminating the need for a slotted link. The slotted saddle hole can allow for movement of an installed positioning pin upon repositioning from the deployed to stowed position or while the deployed railgear is in use. For example, the elongated or slotted saddle hole can allow movement on a poorly maintained road crossing, known as a high crossing, where the road level is higher than the railroad tracks. The slotted shape of saddle hole can allow the railgear to drop down and remain engaged with the railroad tracks and continue to guide the truck straight down the tracks to prevent the truck tires lifting off the railroad tracks, which could cause a derailment.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 4A-4B illustrate exemplary opposite perspective views of a manual pin-off system shown in position with respect to an upper link and lower link in a deployed position of a rear guide wheel assembly as shown in FIG. 1 according to various embodiments of the present disclosure.

FIG. 5 illustrate an example of the manual pin-off system of FIGS. 4A-4B shown in a partially-exploded view according to various embodiments of the present disclosure.

FIGS. 6A-6B illustrate exemplary opposite perspective views of the manual pin-off system shown of FIG. 5 in a retracted position according to various embodiments of the present disclosure.

FIGS. 7A-7B illustrate exemplary opposite perspective views of the manual pin-off system shown of FIG. 5 in an extended (deployed) position according to various embodiments of the present disclosure.

FIGS. 9A-9B illustrate exemplary opposite perspective views of an air operated pin-off system shown in position with respect to an upper link and lower link in a deployed position of a rear guide wheel assembly as shown in FIG. 1 according to various embodiments of the present disclosure.

FIG. 10 illustrates an example of the air operated pin-off system of FIGS. 9A-9B shown in a partially-exploded view according to various embodiments of the present disclosure.

FIGS. 14A-14B illustrate exemplary opposite perspective views of a cable pin-off system shown in position with respect to an upper link and lower link in a deployed position of a rear guide wheel assembly as shown in FIG. 1 according to various embodiments of the present disclosure.

FIGS. 15A-15B illustrate exemplary side and cross-sectional views, respectively, of the cable pin-off system of FIGS. 14A-14B according to various embodiments of the present disclosure.

DETAILED DESCRIPTION

Figure 1:
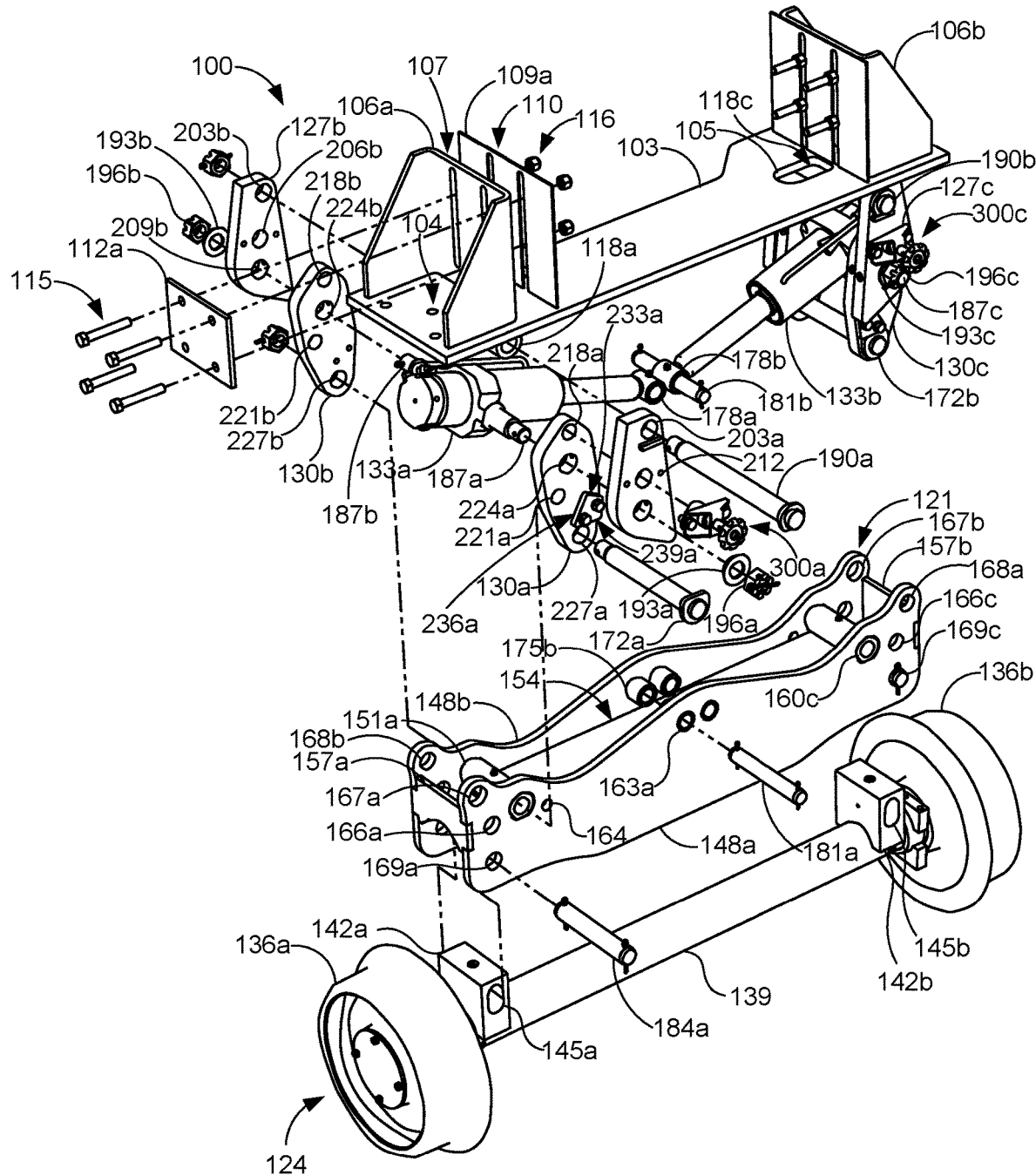
FIG. 1 illustrates an example of a rear guide wheel assembly shown in a partially-exploded view including a manual pin-off system according to various embodiments of the present disclosure.

Described below are various embodiments of the present systems and methods for railgear and automatic locking mechanisms therefor. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth to provide those of ordinary skill in the art with a complete disclosure and description of how to construct and use the systems and methods disclosed and claimed herein. Efforts have been made to ensure accuracy with respect to numbers (e.g., amounts, etc.), but some errors and deviations should be accounted for.

It is to be understood that, unless otherwise indicated, the present disclosure is not limited to particular materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

In the following discussion, a general description of the systems of the present disclosure and their components is provided, followed by a discussion of the operation of the same. Non-limiting examples of a rear guide wheel assembly with pivot links and pin-off lock systems configured to hold a set of railgear in a fixed orientation, either stowed for highway travel or deployed for rail travel and that overcomes such disadvantages are discussed. Further, the present rear guide wheel assembly is adapted to eliminate the need for a slotted link in the linking assembly. Innovatively, the rear guide wheel assembly with pivot links is configured to receive various interchangeable pin-off systems, including but not limited to: a manual pin-off system, an air operated pin-off system, and a cable pin-off system. The linking system and railgear attachment system can also include a weldment for other locking systems including an automatic mechanical lock system described herein. The example pin-off systems can also be configured for front guide wheel assemblies and other applications for locking a moveable/pivoting plate to a stationary plate.

With reference to FIG. 1, shown is a partially-exploded view of a rear guide wheel assembly 100. The rear guide wheel assembly 100 comprises a rear frame mounting bracket 103 with mounting support plates 106 to attach the rear guide wheel assembly 100 to the back end of a vehicle (not shown), for example, to the frame of the vehicle behind the rear vehicle tires. The rear guide wheel assembly 100 can also include rear bracket shims 109, rear bracket plate 112, and fasteners 115 to secure the assembly to the vehicle.

The rear frame mounting bracket 103 can be, but need not be, a substantially flat plate with the mounting support plates 106 mounted on an upper surface of the rear frame mounting bracket 103. The rear frame mounting bracket 103 has a bottom surface that includes upper mounting tubes 118 welded or integrally formed in the rear frame mounting bracket 103. The rear frame mounting bracket 103 comprises attachment holes 104 positioned at each end of the rear frame mounting bracket 103. As shown in FIG. 1, the attachment holes 104 are not used with an interchangeable pin-off system, such as the manual pin-off system 300 shown. In another example, the attachment holes 104 can be configured to receive the optional detent box weldment 603 of the automatic mechanical lock system 600 (FIG. 19), which will be described in more detail herein.

The rear frame mounting bracket 103 can also comprise cylinder openings 105 configured to receive a portion of an actuator 133 when the rear guide wheel assembly 100 is in a stowed position. The cylinder openings 105 can be positioned in an end portion of the rear frame mounting bracket 103. The cylinder openings 105 can be off-set from a center-line of the rear frame mounting bracket 103.

Each mounting support plate 106 can have a main support portion on a first side configured for attachment to the vehicle. The main support portion of each mounting support plate 106 having an interior facing side and an exterior facing side. The mounting support plate 106 can have apertures or slots 107 through a surface of the main support portion, that can be a substantially flat surface. The mounting support plate 106 can be securely mounted on an upper surface of each opposed end portion of the rear frame mounting bracket 103. The mounting support plate 106 can be configured such that main support portion of each mounting support plate 106 is positioned such that the interior facing side of each mounting support plate 106 faces toward each other. The mounting support plate 106 can also have opposed support sides which extend outwardly from the main support portion. When mounted, the support sides can extend towards an end of the rear frame mounting bracket 103, surrounding the attachment holes 104. In some embodiments, the mounting support plate 106 can be formed in one piece, where the support sides are bent at approximately 90 degrees to extend from the main support portion on the exterior facing side.

The rear bracket shim 109 can have openings or slots 110. Each rear bracket shim 109 can be configured to interface with the interior facing surface of the main support portion of each mounting support plate 106 or with another rear bracket shim 109. In some embodiments, the slots 110 are open through an edge of the rear bracket shim 109, such that one or more rear bracket shims 109 can be added for adjustment with the rear bracket plate 112 partially fastened to the mounting support plates 106 with the fasteners 115. In some embodiments, the fasteners 115 are bolts and secured with nuts 116.

The rear bracket plate 112 can have holes 113 to receive the fasteners 115. The rear bracket plate 112 can be configured to be received on and interface with the exterior facing side of the mounting support plate 106. Each fastener 115 can be inserted through the rear bracket plate 112 and mounting support plate 106 and optionally the rear bracket shim 109.

The rear guide wheel assembly 100 can further comprise a railgear attachment frame 121 configured to attach to the railgear 124 in at least two positions and to connect to the rear frame mounting bracket 103 via upper links 127, lower links 130, and actuators 133. The railgear 124 comprises opposed guide wheels 136, an axle 139, and axle saddles 142, with each axle saddle 142 having a saddle hole 145 which extends through the axle saddle. In some embodiments, the saddle hole 145 is a round hole sized to receive positioning pin 184. In some embodiments, the saddle hole 145 is a slotted hole to allow vertical movement of railgear 124.

The railgear attachment frame 121 can have attachment plates, for example two opposing attachment plates 148, spaced by lower mounting tubes 151, a bottom plate 154, and side plates 157. Each attachment plate 148 can include lower mounting holes 160, cylinder mounting holes 163, a drainage hole 164, first position holes 166, second position holes 169, a large hole 167, and a small hole 168. The lower mounting holes 160 are configured to attach the lower links 130. The cylinder mounting holes 163 are configured to attach the actuators 133 between the rear frame mounting bracket 103 and the railgear attachment frame 121. The lower links 130 are configured with lower mounting hole 227 to attach to the lower mounting holes 160 of the attachment frame 121 with a lower mounting pin 172. The railgear attachment frame 121 can be configured to fit over the axle saddle blocks 142 on the axle 139 of the railgear 124. On the inward facing surfaces of each of the attachment plates 148, short tubes 175 can be attached to position and connect a rod portion 178 of the actuator 133 with a cylinder pin 181 through the cylinder mounting holes 163. The drainage hole 164 can be configured to allow passage of fluid which may be within the interior of the railgear attachment frame 121.

A large hole 167 and a small hole 168 can be positioned at opposite top corners of the attachment plate 148. The attachment plate can be substantially symmetrical, except for the drainage hole 164, large hole 167, and small hole 168. As can be understood, the first and second attachment plates 148 of the railgear attachment frame 121 can have the same configuration. When assembled in the railgear attachment frame 121, the center of the large hole 167 of the first attachment plate 148 aligns with the center of the small hole 168 of the second attachment plate 148. Similarly, when assembled in the railgear attachment frame 121 the center of the small hole 168 of the first attachment plate 148 aligns with the center of the large hole 167 of the second attachment plate 148. As shown in FIG. 1, the large hole 167 and a small hole 168 can be left open without attachments for use with an interchangeable pin-off system, such as the manual pin-off system 300 shown. In another example, the large hole 167 and small hole 168 can be configured to receive a seat tube assembly 606 of the automatic mechanical lock system 600 (FIG. 19), which will be described in more detail.

The railgear attachment frame 121 can be configured to fit over the axle saddle blocks 142 on the axle 139 of the railgear 124, such that each side plate 157 is positioned between the axle saddle block 142 and the guide wheel 136 on respective sides of the railgear 124. The railgear attachment frame 121 can be secured to the railgear 124 using a positioning pin 184 using the first position holes 166 or the second position holes 169 in the attachment plates 148. For example, the railgear 124 can be secured at an upper position by inserting a positioning pin 184 through a first position hole 166 of a first attachment plate 148, through the slotted saddle hole 145 of the axle saddle 142, then through the first position hole 166 of a second attachment plate 148.

Upper links 127 can be attached to the rear frame mounting bracket 103 in a stationary or fixed position. Each upper link 127 can have an upper mounting hole 203, a pin-off hole 206, and a pivot hole 209. The upper link 127 can have pin-off fastener holes 212 to mount a pin-off system to the upper link 127. For example, a manual pin-off system 300 is shown (see, for example, FIGS. 2A, 2B). Each lower link 130 can have a deployed pin-off hole 218, stowed pin-off hole 221, cylinder pivot hole 224, and a lower mounting hole 227. The lower link 130 can also comprise a stop 230 with a deployed stop surface 233, a stowed stop surface 236, and a pin head rotation stop surface 239.

Lower links 130 can be connected to each respective upper link 127 in a manner to allow pivoting or partial rotation of the lower link 130 which connects the railgear attachment frame 121. The rear frame mounting bracket 103 and railgear attachment frame 121 can also be connected via an actuator 133 which assists the movement between the stowed and deployed positions. The actuator 133 can include pivot arms 187 to connect to the rear frame mounting bracket 103 via the upper links 127 and the railgear attachment frame 121 via the lower links 130.

The upper link 127 can comprise a plate with a first and a second facing surface. The upper link 127 can be shaped to allow free movement from a first to second position. The upper link 127 can comprise one or more flat surfaces along the perimeter edge of the upper link 127. The upper link 127 can comprise one or more contoured surfaces along the perimeter edge of the upper link 127. Similarly, the lower link 130 can comprise a plate with a first and a second facing surface. The lower link 130 can be shaped to allow free movement from a first to second position, can have one or more flat or contoured edges, and can have a different shape than upper link 127. The links 127,130 can be arranged such that the first facing surface of the lower link 130 comprises the stop 230 and faces the second facing surface of the upper link 127. For example, the upper link 127 can have a first flat edge that can be configured to engage with the bottom surface of the rear frame mounting bracket 103, a second flat edge configured to engage with the stop 230 of the lower link 130 when the links are in a first position, and a third flat edge configured to engage with the stop 230 of the lower link 130 when the links are in second position.

As shown in FIG. 1, an example rear guide wheel assembly 100 can have a symmetrical configuration with two independent actuators 133a,133b facilitating the movement of the railgear 124 between the deployed and stowed positions. The pivot arms 187a-d can be positioned in the cylinder pivot holes 224a-d of the lower links 130a-d and the pivot holes 209a-d of the upper links 127a-d. Washers 193a-d and nuts 196a-d can be used to secure the pivot arms 187a-d, while allowing movement of lower links 130a-d. The upper links 127a-d can be mounted to the rear frame mounting bracket 103 by inserting upper mounting pins 190a,190b through upper mounting holes 203a, 203c of the upper links 127a,127c, through the upper mounting tubes 118a,118b, and upper mounting holes 203b, 203d to connect the upper links 127b,127d. The rod portion 178a,178b of each actuator 133a,133b can be positioned between short tubes 175a-d of the railgear attachment frame 121 and secured with the cylinder pin 181a,181b. The lower links 130a-d can be mounted to the railgear attachment frame 121 using lower mounting holes 227a-d. For example, the lower mounting pins 172a,172b can pass through lower mounting holes 227a,227c of lower links 130a,130c, lower mounting holes 160a,160c of attachment plate 148a, through lower mounting tubes 151a,151b, through lower mounting holes 160b,160d of attachment plate 148b, and through lower mounting holes 227b,227d of lower links 130b,130d.

While the two independent actuators 133a,133b facilitating the movement of the railgear 124 between the deployed and stowed positions can operate at the same speed, they can also operate independently. Side shift can be activated by controlling the speed of the two cylinders independently. For example, a first actuator 133a can be actuated faster than a second actuator 133b. The different speeds of the first and second actuators 133a,133b can cause the railgear axle 124 to move off-center during the motion of moving from the stowed position to the deployed position, allowing a user to line up the railgear 124 with railroad tracks that may not be centered underneath the vehicle. As the actuators each approach the end of stroke in the deployed position, the railgear 124 can re-center and pull the vehicle over to align the vehicle centered over the railroad tracks.

Figures 2A, 2B:
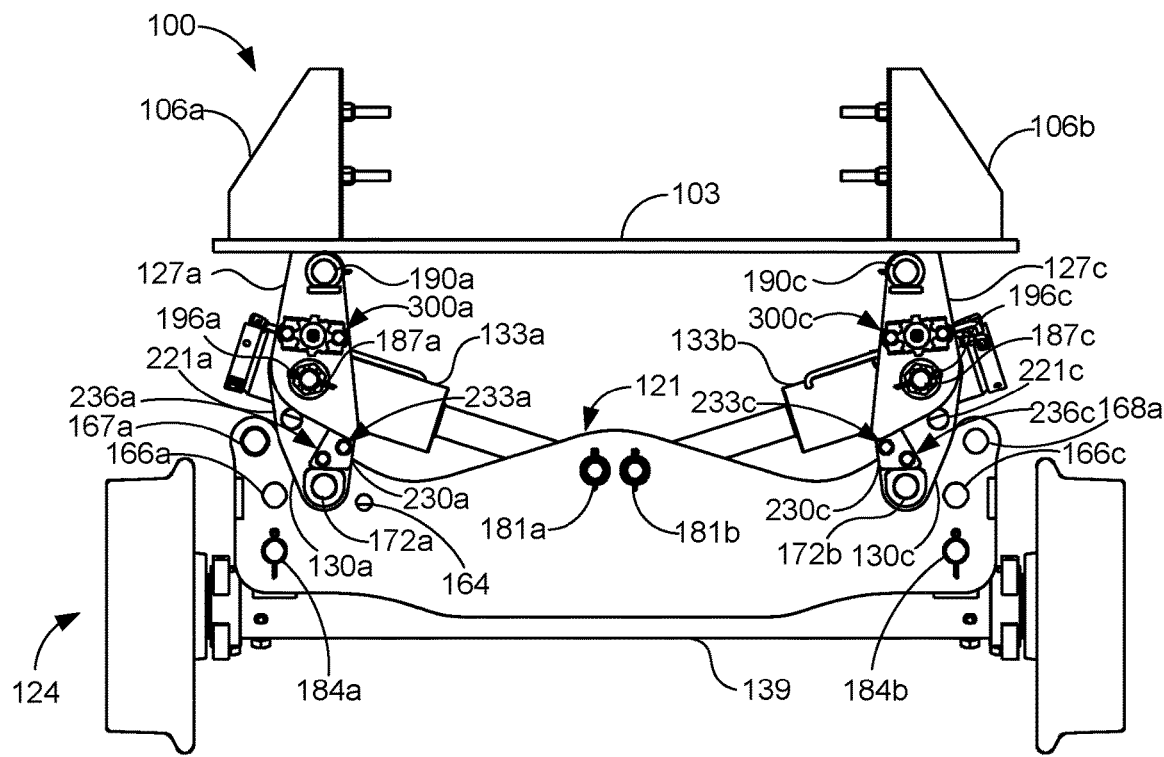
FIGS. 2A-2B illustrate an example rear view of the rear guide wheel assembly shown in FIG. 1 in deployed (FIG. 2A) and stowed (FIG. 2B) positions according to various embodiments of the present disclosure.
Figure 3A:
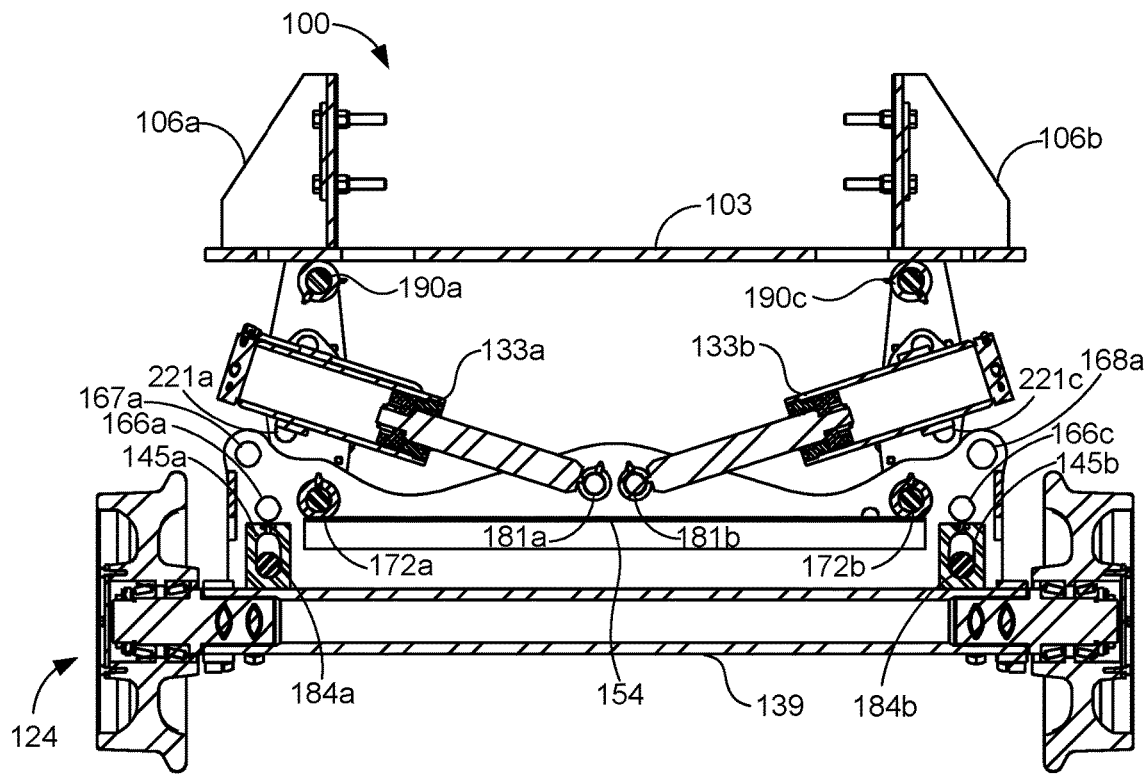
FIGS. 3A-3B illustrate an example cross-sectional view of the rear guide wheel assembly shown in FIG. 1 in deployed (FIG. 3A) and stowed (FIG. 3B) positions according to various embodiments of the present disclosure.
Figure 3B:
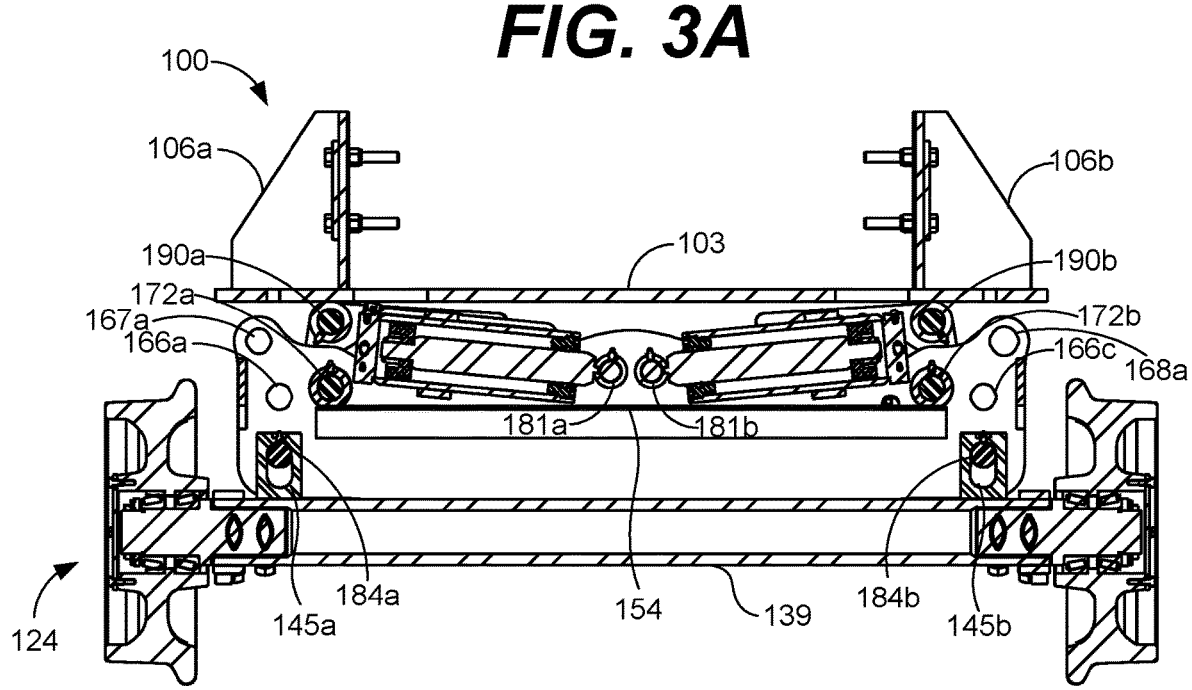

The railgear 124 can be deployed in an extended position (FIGS. 2A and 3A) for use on the railway or in a stowed position (FIGS. 2B and 3B). The railgear 124 can be secured in either the deployed or stowed position using various interchangeable pin-off systems, including but not limited to: a manual pin-off system, an air operated pin-off system, and a cable pin-off system. For example, a manual pin-off system 300 is shown in FIGS. 1, 2A, and 2B. The railgear 124 also can be secured in the stowed position using the automatic mechanical lock system 600 (FIGS. 24B and 25B).

Rear views of the rear guide wheel assembly 100 in FIGS. 2A-2B show the positioning of the upper and lower links 127,130 with respect to the rear frame mounting bracket 103 and railgear attachment frame 121 in the deployed (FIG. 2A) and stowed (FIG. 2B) positions. The stop 230 is also shown with respect to the upper link 127, with the deployed stop surface 233 in contact with the second flat edge of the upper link 127 in the deployed position (FIG. 2A) and the stowed stop surface 236 in contact with the third flat edge in contact the upper link 127 in the stowed position (FIG. 2B).

Shown in FIGS. 3A-3B are cross-sectional views of the rear guide wheel assembly 100 shown in FIG. 1 in deployed (FIG. 3A) and stowed (FIG. 3B) positions. The upper and lower links 127,130 in combination with the selectable first and second position holes 166,169 of the railgear attachment frame 121, and the saddle hole 145 of the axle saddles 142 provides the advantage of a universal bolt pattern, instead of a specific weldment to thereby accommodate vehicles of different specifications. In particular, the hole positions 166,169 of the railgear attachment frame 121 allow the railgear 124 to be moved up or down to accommodate vehicles of different heights. This eliminates the need for multiple length configurations of links and eliminates the need for multiple actuator or cylinder configurations to fit the various sizes of links.

In some embodiments, the saddle hole 145 provided in the axle saddle 142 is elongated, eliminating the need for a slotted link. The slotted saddle hole 145 can allow for movement of the installed positioning pin 184 upon repositioning from the deployed to stowed position or while the deployed railgear 124 is in use. For example, the elongated or slotted saddle hole 145 can allow movement on a poorly maintained road crossing, known as a high crossing, where the road level is higher than the railroad tracks. The slotted shape of saddle hole 145 allows the railgear 124 to drop down and remain engaged with the railroad tracks and continue to guide the truck straight down the tracks to prevent the truck tires lifting off the railroad tracks, which could cause a derailment.

In FIG. 3A, with the railgear 124 deployed, the positioning pins 184 are in the second position holes 169 and at the bottom of the saddle hole 145. However, with the railgear 124 retracted, as shown in FIG. 3B, the positioning pins 184 are moved to the top of the saddle hole 145. When the positioning pins 184 can be moved to the first position holes 166, the clearance between bottom plate 154 and the axle 139 is sufficient in either the deployed or stowed position of the railgear 124.

Referring to FIGS. 4A-4B, an example of a manual pin-off system 300 is shown in position with respect to an upper link 127 and lower link 130 in a deployed position of a rear guide wheel assembly 100 as shown in FIG. 1. The upper and lower links 127,130 with pin-off fastener holes 212 provide a universal bolt pattern to allow for interchangeable pin-offs. The manual pin-off system 300 can be attached to an upper link 127 to provide a means to lock the railgear 124 in a stowed or deployed position.

FIG. 5 illustrates an example of the manual pin-off system 300 in a partially-exploded view. The manual pin-off base 303 can have a flat portion 306 configured to abut the upper link 127. Extending from the flat portion 306 is cylindrical portion 309 with a center aperture 312 configured to receive a manual pin-off pin 315, the cylindrical portion 309 configured to be received in the pin-off hole 206 of the upper link 127 with a tight fit. The manual pin-off pin 315 can have a side hole 318 in the body of the pin to receive a plunger 321. The plunger 321 can be installed with nose flush with the manual pin-off pin 315. Opposite the flat portion 306, the manual pin-off base 303 can have a knob aperture 324 to receive the stem of a knob 327 having a center hole 330. A cap screw 333 can be inserted through the center hole 330 of the knob 327, through the manual pin-off base 303, to engage with the manual pin-off pin 315. The manual pin-off base 303 can have fastener holes 339 in the flat portion 306 configured to correspond with the pin-off fastener holes 212 of the upper link 127. The manual pin-off base 303 can be secured to the upper link 127 with lock washers 342 and fasteners 345.

Figure 8A:
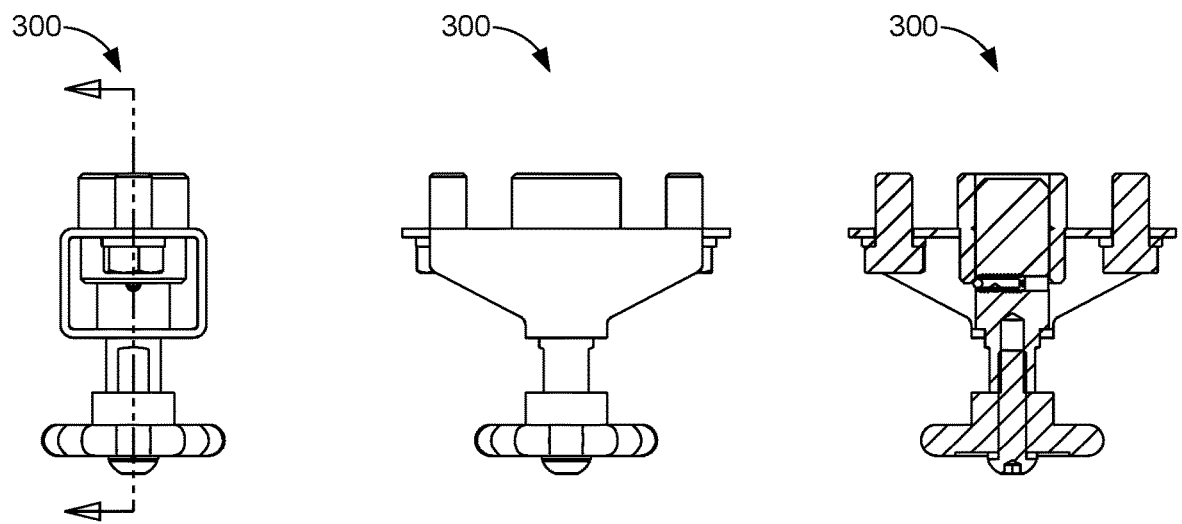
FIGS. 8A-8B illustrate front, side, and cross-sectional views of the manual pin-off system shown of FIG. 5 in a retracted position (FIG. 8A) and extended position (FIG. 8B) according to various embodiments of the present disclosure.
Figure 8B:
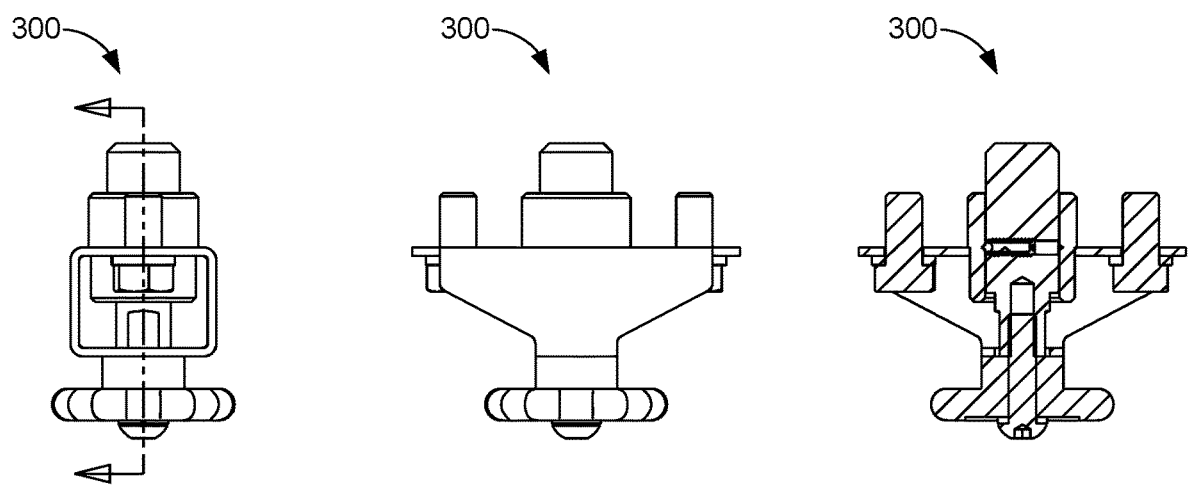

The manual pin-off system 300 can be operated by pushing the knob to extend the manual pin-off pin 315 into the either the deployed pin-off hole 218 or the stowed pin-off hole 221 of the lower link 130 to secure the railgear 124 in either the deployed or stowed position, respectively. FIGS. 6A-6B and 8A provide multiple views of the manual pin-off system 300 with the manual pin-off pin 315 retracted. FIGS. 7A-7B and 8B provide multiple views of the manual pin-off system 300 with the manual pin-off pin 315 extended.

Referring to FIGS. 9A-9B, an example of an air operated pin-off system 400 is shown in position with respect to an upper link 127 and lower link 130 in a deployed position of a rear guide wheel assembly 100 as shown in FIG. 1. The upper and lower links 127,130 with pin-off fastener holes 212 provide a universal bolt pattern to allow for interchangeable pin-offs. The air operated pin-off system 400 can be attached to an upper link 127 to provide a means to lock the railgear 124 in a stowed or deployed position.

FIG. 10 illustrates an example of the air operated pin-off system 400 in a partially-exploded view. The air pin-off base 403 can have a portion 406, preferably a flat portion, configured to abut the upper link 127. Extending from the flat portion 406 is portion 409, that can be a cylindrical portion, with a center aperture 412. The portion 409 can be configured to be received in the pin-off hole 206 of the upper link 127 with a tight fit. Opposite the portion 406, the air pin-off base 403 can have a base aperture 415. In some aspects, air operated pin-off pin 418 can be positioned attached to an air cylinder 421 with an inline ball joint 424, secured with a washer 427 on the pin side and jam nut 430 at the air cylinder 421 to form a pin assembly. The air operated pin-off pin 418 can be inserted through the base aperture 415 into the center aperture 412 of the cylindrical portion 409 with the air cylinder 421 secured to the air pin-off base 403 with fasteners 433 and nuts 436. The air pin-off base 403 can have fastener holes 439 in the portion 406 configured to correspond with the pin-off fastener holes 212 of the upper link 127. The air pin-off base 403 can be secured to the upper link 127 with lock washers 442 and fasteners 445.

Figure 11A:
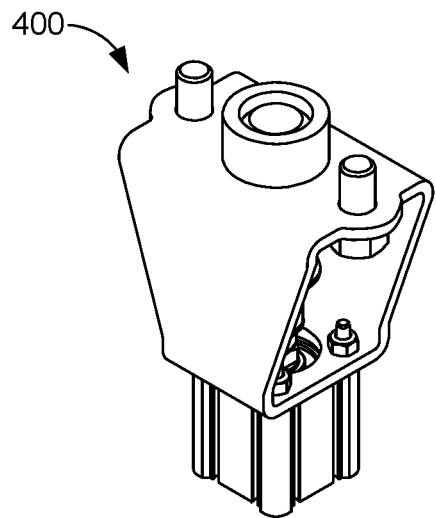
FIGS. 11A-11B illustrate exemplary opposite perspective views of the air operated pin-off system shown of FIG. 10 in a retracted position according to various embodiments of the present disclosure.
Figure 11B:
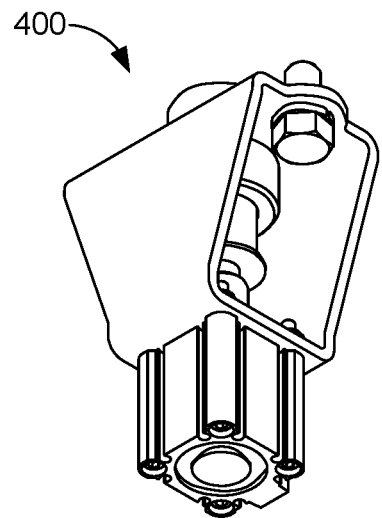
Figure 12A:
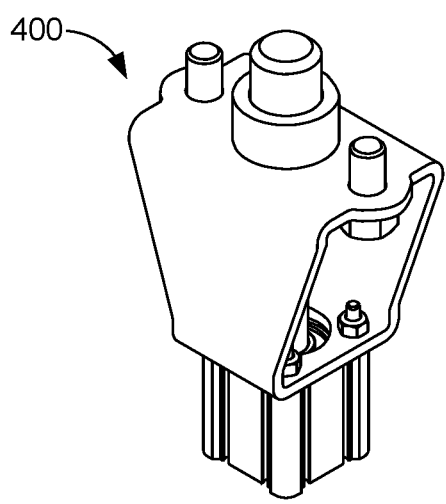
FIGS. 12A-12B illustrate exemplary opposite perspective views of the air operated pin-off system shown of FIG. 10 in an extended (deployed) position according to various embodiments of the present disclosure.
Figure 12B:
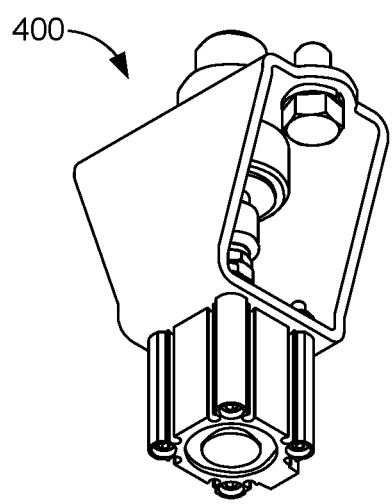
Figure 13A:
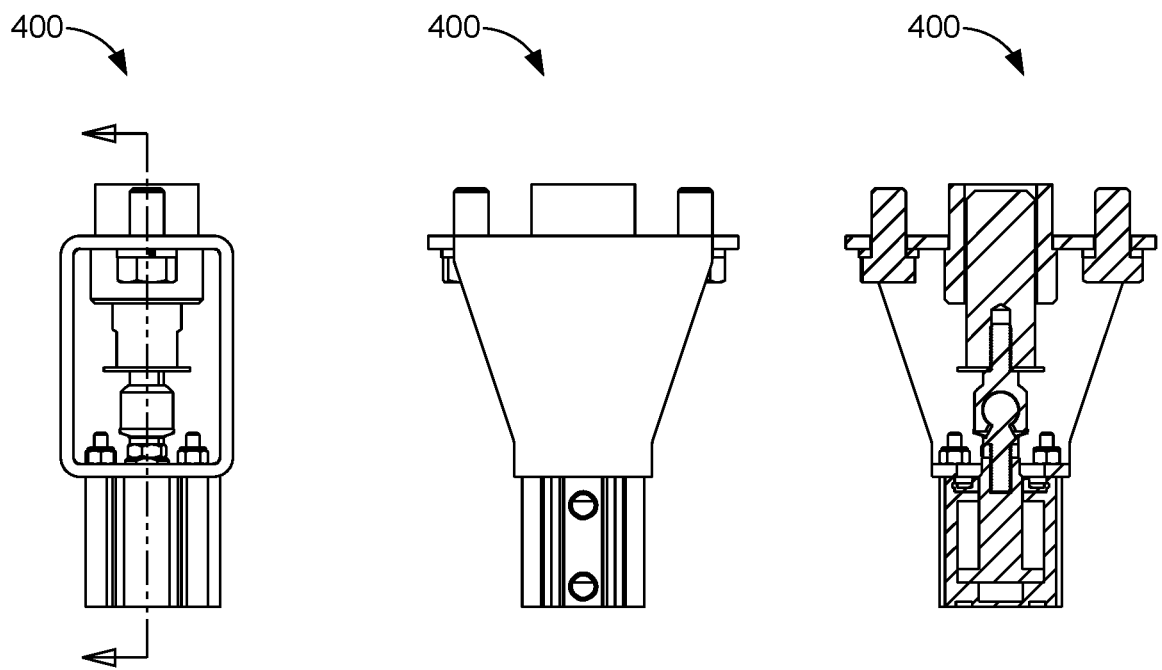
FIGS. 13A-13B illustrate front, side, and cross-sectional views of the air operated pin-off system shown of FIG. 10 in a retracted position (FIG. 13A) and extended (deployed) position (FIG. 13B) according to various embodiments of the present disclosure.
Figure 13B:
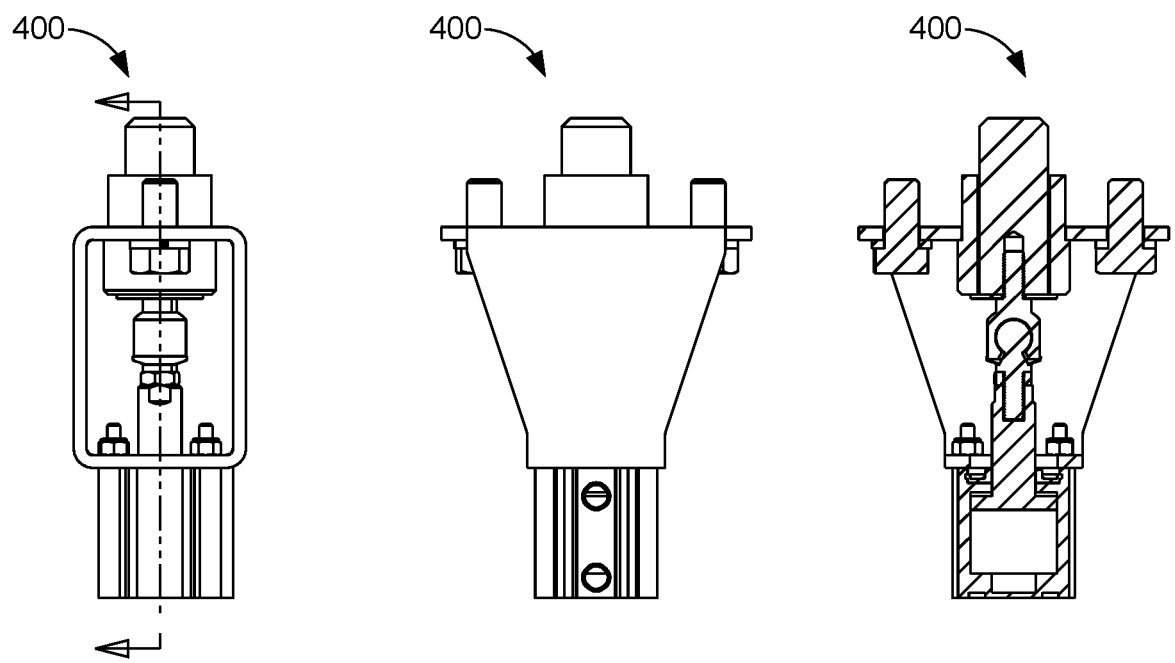

The air operated pin-off system 400 can be operated by the air cylinder 421 to extend the air operated pin-off pin 418 into the either the deployed pin-off hole 218 or the stowed pin-off hole 221 of the lower link 130 to secure the railgear 124 in either the deployed or stowed position, respectively. FIGS. 11A-11B and 13A provide multiple views to the air operated pin-off system 400 with the air operated pin-off pin 418 retracted. FIGS. 12A-12B and 13B provide multiple views to the air operated pin-off system 400 with the air operated pin-off pin 418 extended.

Referring to FIGS. 14A-14B, an example of a cable operated pin-off system 500 is shown in position with respect to an upper link 127 and lower link 130 in a deployed position of a rear guide wheel assembly 100 as shown in FIG. 1. The upper and lower links 127,130 with pin-off fastener holes 212 provide a universal bolt pattern to allow for interchangeable pin-offs. The cable operated pin-off system 500 can be attached to an upper link 127 to provide a means to lock the railgear 124 in a stowed or deployed position.

FIGS. 15A and 15B show side and cross-sectional views, respectively, of an example cable operated pin-off system 500. The cable operated pin-off system 500 can comprise a cable bulkhead 503 extending from a mounting tube 506 to a mount assembly 509. The mount assembly 509 can comprise the cable pin-off base 512 including a portion 515, preferably a flat portion, configured to abut the upper link 127. Extending from the portion 515 is cylindrical portion 518 with a center aperture 521. The cylindrical portion 518 can be configured to be received in the pin-off hole 206 of the upper link 127 with a tight fit. A cable pin-off pin 524 can be seated in the center aperture 521 of the cylindrical portion 518 of the cable pin-off base 512. The cable pin-off base 512 can have fastener holes 572 in the flat portion 515 configured to correspond with the pin-off fastener holes 212 of the upper link 127. The mount assembly 509 can also comprises a plate 527, preferably a flat plate, having a plate hole 530 separated from the cable pin-off base 512 by two detent spacer tubes 533 and secured to each other with fasteners 536 extending through the detent spacer tubes 533 and lock washers 539. The fasteners 536 can extend through the fastener holes 572 such that the cable pin-off base 512 can be secured to the upper link 127.

A first end of the cable bulkhead 503 can have a swivel portion 545 connected by fastening means to the mount assembly 509. A cable or flexible rod 548 can extend through the cable bulkhead 503 and into the plate hole 530 of the mount assembly 509. The cable 548 can extend through a spring 551 positioned between the flat plate 527 and the cable pin-off pin 524. The cable 548 can be secured to the cable pin-off pin 524 with a fender washer 554 and jam nut 557. The second end of the cable bulkhead 503 having a swivel portion 560 can be connected by fastening means to the mounting tube 506. The cable 548 can pass through first and second holes 563, 566 in the mounting tube 506 and can be terminated with a handle assembly 569. The mounting tube 506 can have mounting holes 575 to attach the mounting tube 506 to a vehicle such that the handle 569 in an accessible position.

Figure 16A:
FIGS. 16A-16B illustrate exemplary opposite perspective views of the cable pin-off system shown of FIG. 14A in a retracted position according to various embodiments of the present disclosure.
Figure 16B:
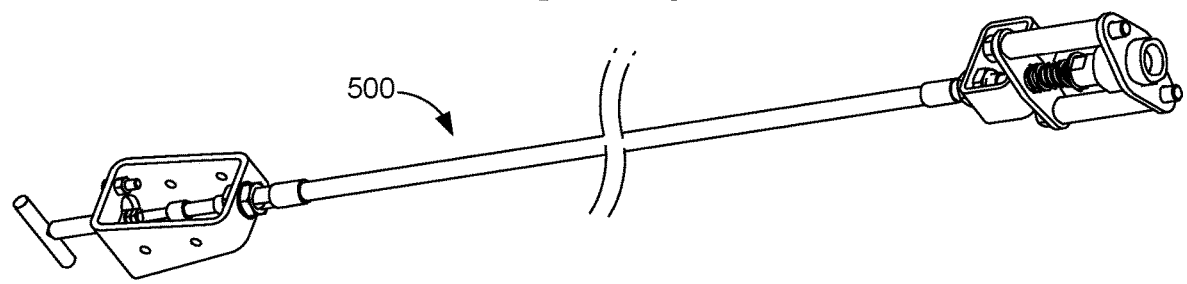
Figure 17A:
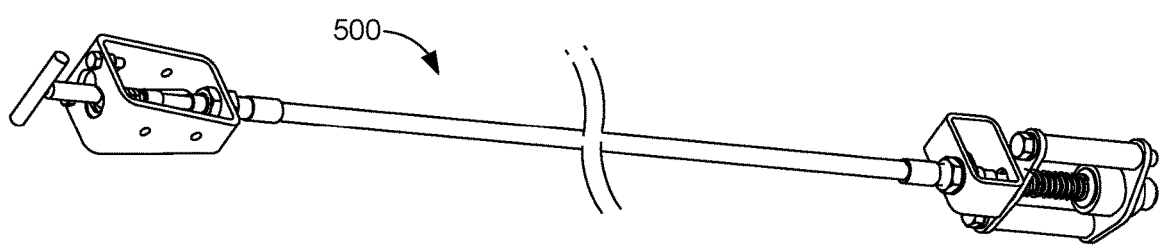
FIGS. 17A-17B illustrate exemplary opposite perspective views of the cable pin-off system shown of FIG. 14A in an extended position according to various embodiments of the present disclosure.
Figure 17B:
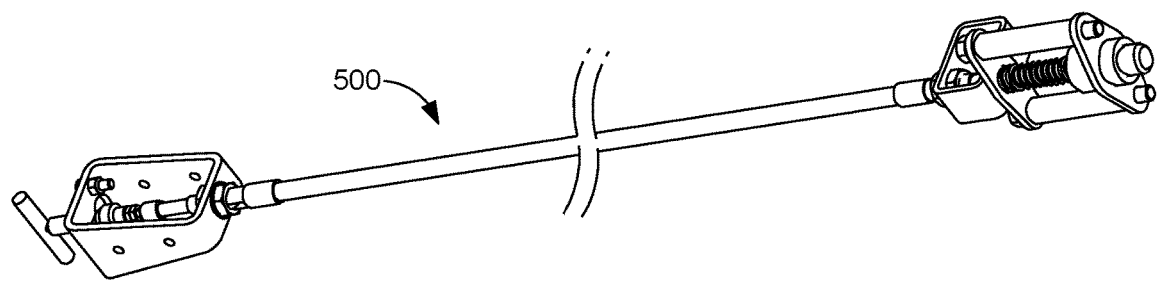
Figure 18A:
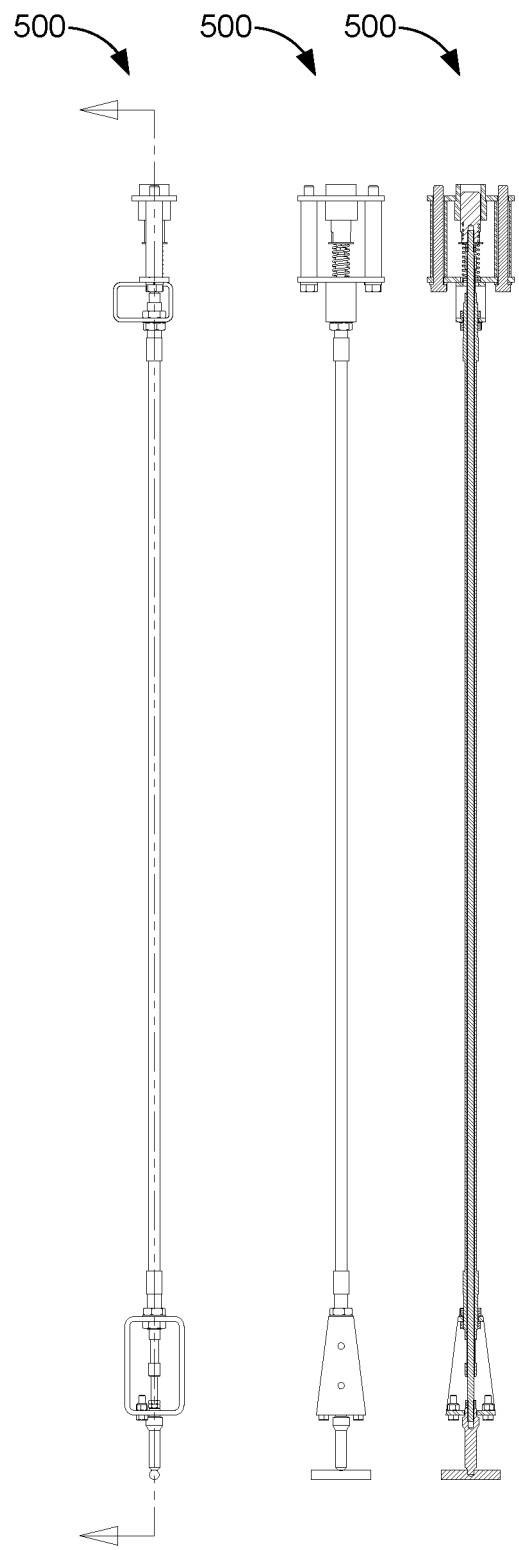
FIGS. 18A-18B illustrate front, side, and cross-sectional views, respectively, of the cable pin-off system shown of FIG. 14A in a retracted position (FIGS. 16A-16B) and extended (deployed) position (FIGS. 17A-17B) according to various embodiments of the present disclosure.
Figure 18B:
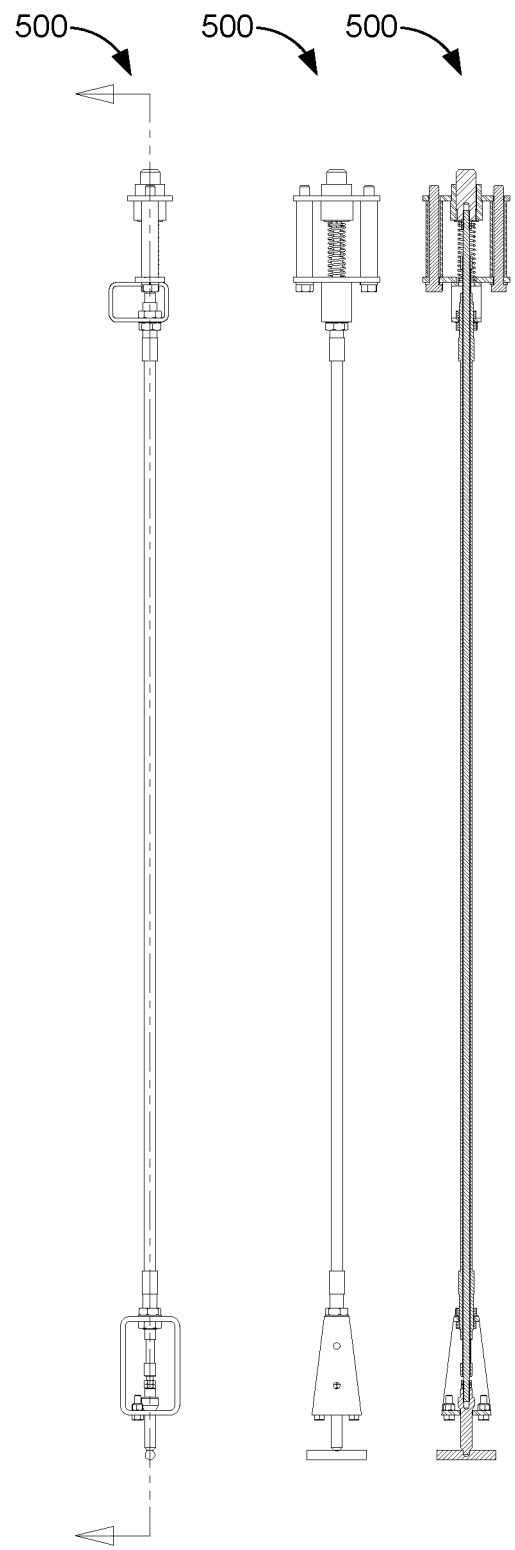

The cable operated pin-off system 500 can be operated via a cable to extend the cable pin-off pin 524 into the either the deployed pin-off hole 218 or the stowed pin-off hole 221 of the lower link 130 to secure the railgear 124 in either the deployed or stowed position, respectively. FIGS. 16A-16B and 18A provide multiple views to the cable operated pin-off system 500 with the cable pin-off pin 524 retracted. FIGS. 17A-17B and 18B provide multiple views to the cable operated pin-off system 500 with the cable pin-off pin 524 extended.

Figure 19:
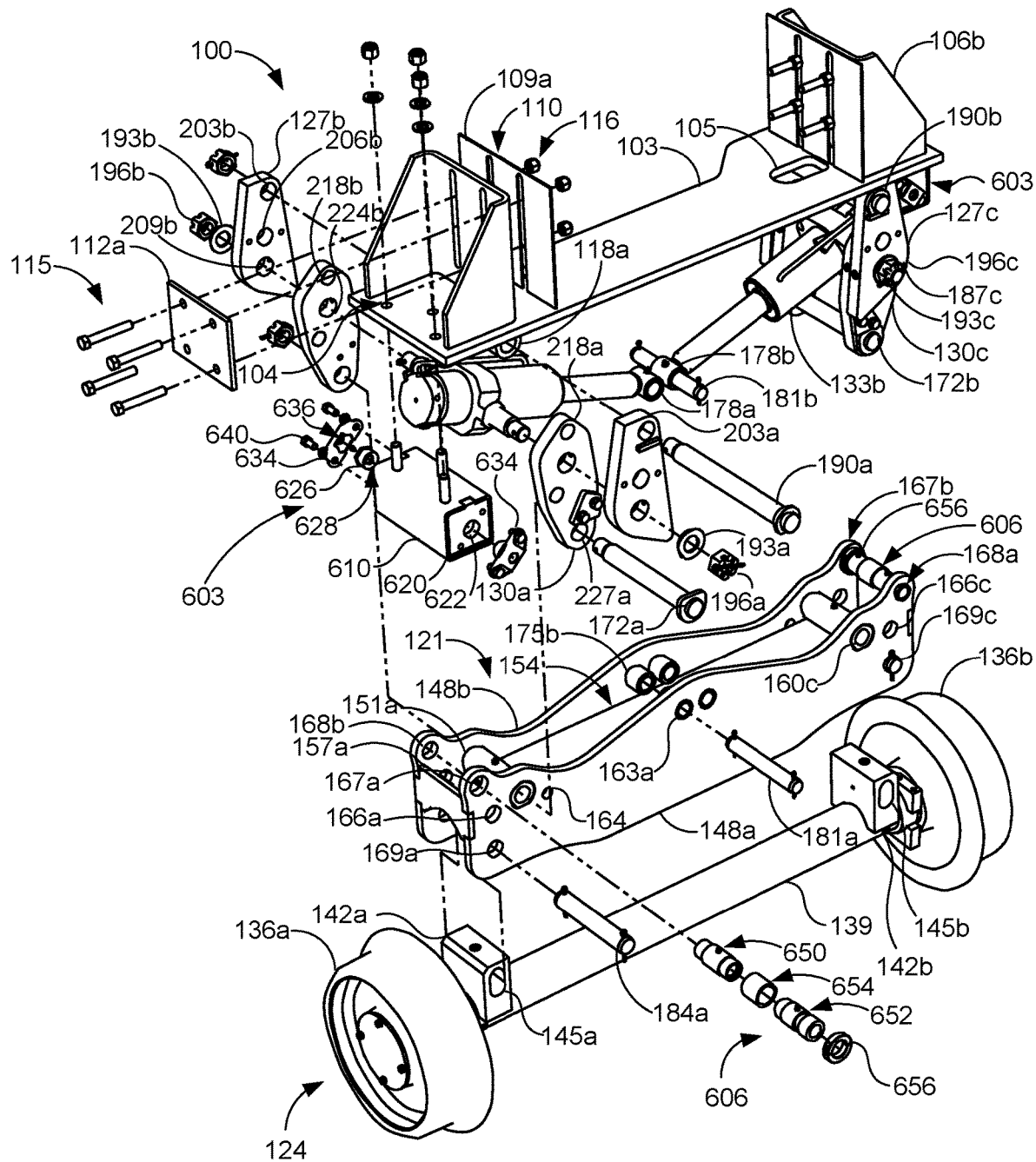
FIG. 19 illustrates an example of a rear guide wheel assembly shown in a partially-exploded view including an automatic mechanical lock system according to various embodiments of the present disclosure.

Referring to FIG. 19, an example of an automatic mechanical lock system 600 is shown in position with respect to a rear frame mounting bracket 103 and a railgear attachment frame 121 of a rear guide wheel assembly 100 as shown in FIG. 1. In this example, the manual pin-off system 300 is removed from the configuration and an automatic mechanical lock system 600 is provided. The automatic mechanical lock system 600 can be used to secure the rear guide wheel assembly 100 in the stowed position. The automatic mechanical lock system 600 can comprise an upper lock device, also called a detent box weldment 603, attached to the rear frame mounting bracket 103 and a lower lock device, also called a seat tube assembly 606, attached to the railgear attachment frame 121. The automatic mechanical lock system 600 can be configured to lock the rear frame mounting bracket 103 directly to the railgear attachment frame 121 and does not connect to the pin-off hole 206 of the upper link 127 and deployed pin-off hole 218, stowed pin-off hole 221 of the lower line 130, which are used with the interchangeable pin-off systems (i.e. the manual pin-off system 300, the air operated pin-off system 400, or the cable operated pin-off system 500).

Figure 20:
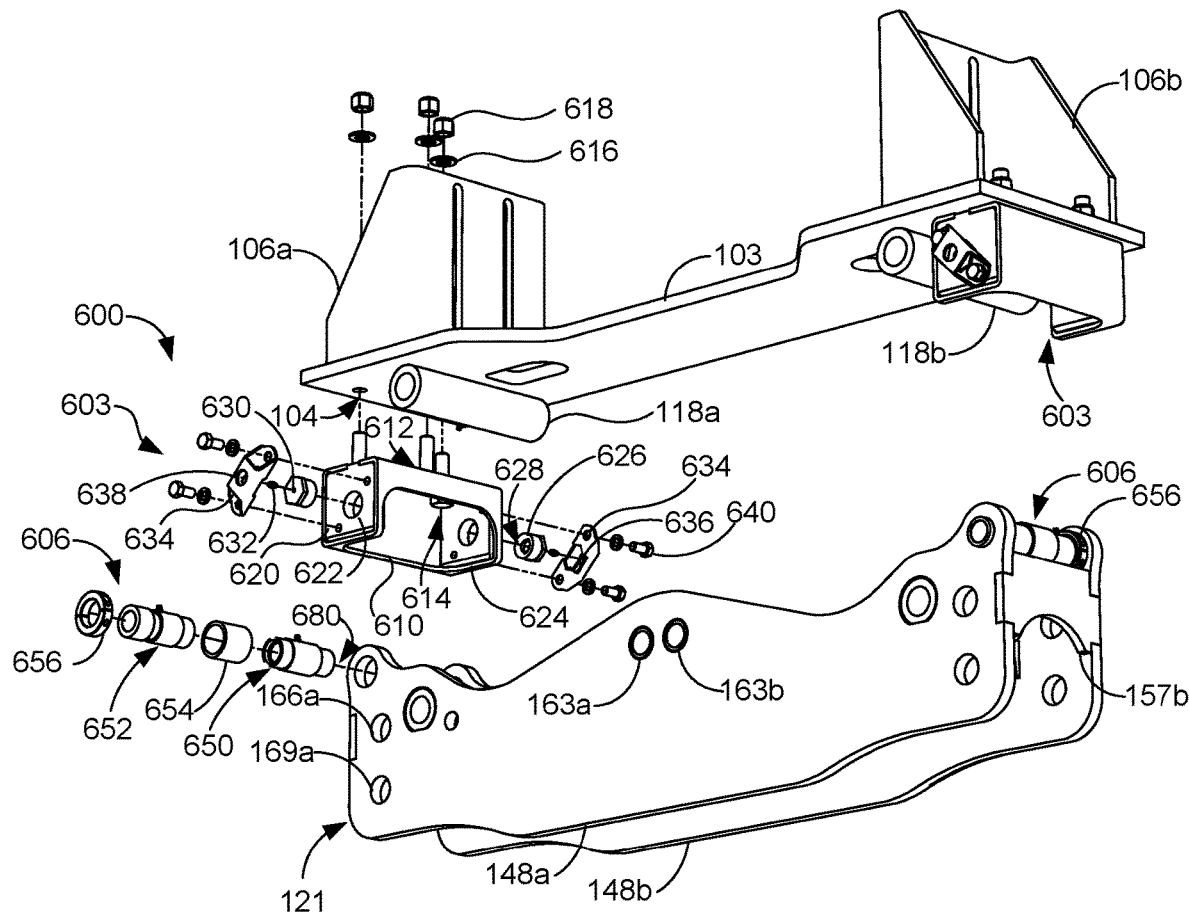
FIG. 20 illustrates a perspective view of an example automatic mechanical lock system shown in position with respect to a rear frame mounting bracket and rail gear attachment frame of a rear guide wheel assembly as shown in FIG. 19 according to various embodiments of the present disclosure.

Referring to FIG. 20, an example of an automatic mechanical lock system 600 comprising the detent box weldment 603 and a seat tube assembly 606 is shown in respect to a rear frame mounting bracket 103 and a railgear attachment frame 121 of a rear guide wheel assembly 100 as shown in FIG. 19. The detent box weldment 603 is shown in an exploded view on the left side of the rear frame mounting bracket 103 and in an assembled view attached on the right side of the rear frame mounting bracket 103. The detent box weldment 603 of the automatic mechanical lock system 600 can comprise a detent box tube 610 configured to be attached to the bottom surface of the rear frame mounting bracket 103 via the attachment holes 104 positioned at each end of the rear frame mounting bracket 103. The detent box tube 610 can have four walls and two ends. In an aspect, a first wall of the detent box tube 610 can be substantially flat having fastening holes 612 configured to correspond with the attachment holes 104 of the rear frame mounting bracket 103. Fasteners 614 can be used to secure the detent box tube 610 to the rear frame mounting bracket 103 via fastening holes 612 and attachment holes 104. In an embodiment, the fasteners 614 can be bolts with washers 616 and nuts 618 used to secure the detent box tube 610. In an aspect, the second wall of the detent box tube 610, adjacent to the first wall, can be substantially flat. The third and fourth walls of the detent box tube 610, opposite the first and second walls, respectively, can each have an open portion where the third and fourth walls meet for access to the interior of the detent box tube 610 and configured to receive at least a portion of the railgear attachment frame 121.

The detent box tube 610 can further comprise detent box caps 620 at each of the two ends. The detent box caps 620 can comprise a center aperture 622 and at least one chamfered edge 624. The center aperture 622 can be configured to receive a detent catch 626. The detent catch 626 can have a cylindrical body and a head. The body of the detent catch 626 can have a length substantially equal to the thickness of the detent box cap 620. The body of the detent catch 626 can be configured as a detent seat 628 to receive at least a portion of the detent 680 of the seat tube assembly 606. The head of the detent catch 626 can have a cross-sectional shape with at least one flat section configured to interface with the detent box cap 620. The head of the detent catch 626 can have two opposed sides, or can be polygonal, hexagonal or octagonal in shape. The detent catch 626 can comprise a through-hole 630 in the head of the detent catch 626 to the seat 628. The through-hole 630 can receive a grease fitting 632 to allow lubrication of the detent seat 628.

An anti-rotation plate 634 can have a base with an aperture 636 with at least one flat side or section and configured to receive the head of the detent catch 626. The anti-rotation plate 634 can be positioned on an exterior side of the detent box cap 620 with a tight fit of the head and the aperture 636 of the anti-rotation plate 634. The aperture 636 of the anti-rotation plate 634 can have two opposed sides, or can have a polygonal, hexagonal or octagonal shaped opening for receiving and securing the head of the detent catch 626 against rotation. The anti-rotation plate 634 can also have a top portion substantially parallel to the base of the anti-rotation plate 634. The top portion can have an access aperture 638 to allow access to the grease fitting 632 of the detent catch 626. The anti-rotation plate 634 can be secured to the detent box cap 620 of the detent box weldment 603 with fasteners 640 via holes in the base of the anti-rotation plate 634 and the holes in the detent box cap 620.

To address any wear issues of the seat 628 of the detent catch 626, for example asymmetrical wear of the seat 628, the anti-rotation plate 634 can be removed and the detent catch 626 rotated for continued use. For example, if the head of the detent catch 626 can be hexagonal in shape, the catch may be rotated to another position, and re-fit into the aperture 636. The anti-rotation plate 634 can be replaced and secured back in place with the fasteners 640.

Figure 21:
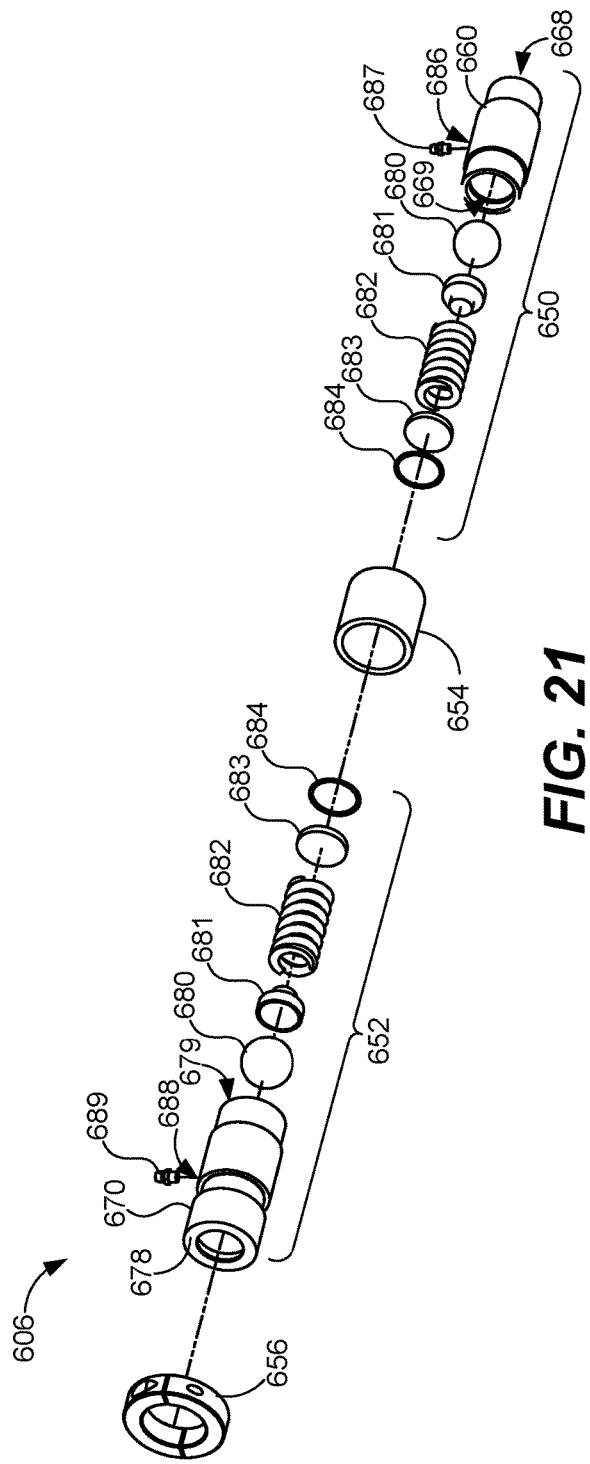
FIG. 21 illustrates an exploded view of the tube assembly or lower lock device of the automatic mechanical lock system shown in FIG. 20 according to various embodiments of the present disclosure.

Shown in FIG. 21 is an exploded view of the seat tube assembly 606, or lower lock device. The seat tube assembly 606 can comprise a first seat tube 650, a second seat tube 652, a joint connector 654, and a shaft collar 656. The first seat tube 650 and the second seat tube 652 can operate in the same manner but can differ in external dimensions. The first seat tube 650 comprises a first tube body 660 which in an aspect can be substantially cylindrical. The first tube body 660 can have a first end 661 and a second end 662. The exterior surface of the first tube body 660 can have a first end portion 663, a second end portion 664, and a center portion 665. The interior portion of the first and second seat tubes 650,652 can be substantially the same. Each of the first and second tube body 660,670 can be hollow with an interior diameter (Di) configured to contain a detent 680 (such as a ball or pin), a detent cup 681, a spring 682, a cap 683, and a retaining ring 684.

The first tube body 660 can be formed with a rim 668 on the first end 661 and an opening 669 at the opposite second end 662. The rim 668 can have an aperture diameter (Do) that is smaller than the inner diameter (Di) of the first tube body 660 and smaller than the diameter of the detent 680. The first tube body 660 can be configured such that the inner diameter (Di) can be substantially the same diameter as the detent 680 with a clearance for movement of the detent 680 within the first tube body 660. The detent 680 can be inserted to protrude outwardly through the aperture of the rim 668, but retained within the first end 661 of the first tube body 660 by the smaller diameter of the rim 668, and contained internally within the opposed end of the first tube body 660 by the detent cup 681 and spring 682. The first seat tube 650 can also include a cap 683 and a retaining ring 684 to close the opening 669 on the opposite end 662. The first seat tube 650 can also include a wall aperture 686 in the center portion 665 adapted to receive a grease fitting 687.

A spring 682 can be positioned within the first seat tube 650 between the detent cup 681 and the cap 683. The spring 682 can be biased to maintain in contact with the detent cup 681. The spring 682 can be configured to push or bias the detent cup 681 and detent 680 against the reduced aperture of the rim 668 of the first end 661 with a portion of the detent protruding. The spring 682 can be configured to apply a force to the detent 680 via the detent cup 681. If an outside force is applied to the detent 680, the detent 680 can be moved longitudinally within the inner wall in an inward direction away from the opening formed by rim 668 and compress the spring 682.

Similarly, the second tube body 670 can be formed with a rim 678 on the first end 671 and an opening 679 at the opposite second end 672. The exterior surface of the second tube body 670 can have a first end portion 673, a second end portion 674, a recess portion 675, and a central portion 676. The rim 678 can have an aperture diameter (Do) that is smaller than the inner diameter (Di) of the second tube body 670 and smaller than the diameter of the detent 680. The second tube body 670 can be configured such that the inner diameter (Di) can be substantially the same diameter as the detent 680 with a clearance for movement of the detent 680 within the second tube body 670. The detent 680 can be inserted to protrude outwardly through the aperture of the rim 678, but retained within the first end 671 of the second tube body 670 by the smaller diameter of the rim 678, and contained internally within the opposed end of the second tube body 670 by the detent cup 681 and spring 682. The second seat tube 652 can also include a cap 683 and a retaining ring 684 to close the opening 679 on the opposite end 672. The second seat tube 652 can also include a wall aperture 688 in the central portion 676 adapted to receive a grease fitting 689.

A spring 682 can be positioned within the second seat tube 652 between the detent cup 681 and the cap 683. The spring 682 can be biased to maintain in contact with the detent cup 681. The spring 682 can be configured to push or bias the detent cup 681 and detent 680 against the reduced aperture of the rim 678 of the first end 671 with a portion of the detent protruding. The spring 682 can be configured to apply a force to the detent 680 via the detent cup 681. If an outside force is applied to the detent 680, the detent 680 can be moved longitudinally within the inner wall in an inward direction away from the opening formed by rim 678 and compress the spring 682.

As shown in FIG. 19, the seat tube assembly 606 can be configured to be received within the railgear attachment frame 121. The seat tube assembly 606 can be inserted into the large hole 167 of a first attachment plate 148a and the first end portion 663 of the first seat tube 650 received into the small hole 168 of a second attachment plate 148b, such that the first shoulder 691 of the first seat tube 650 abuts the interior surface of the second attachment plate 148b. The first end portion 673 of the second seat tube 652 being received in the large hole 167 of the first attachment plate 148a. The seat tube assembly 606 can be secured in place by the shaft collar 656 surrounding the second seat tube 652 at the recess portion 675. The seat tube assembly 606 can be secured to the railgear attachment frame 121 with a shaft collar 656 positioned on the interior of the railgear attachment frame 121. The shaft collar 656 can be in two pieces for installation and secured with a fastener or set screw. As can be understood, the attachment plates 148a and 148b can have the same configuration, such that when assembled in the railgear attachment frame 121 the center of the large hole 167 of attachment plate 148a aligns with the center of the small hole 168 of attachment plate 148b. Similarly, when assembled in the railgear attachment frame 121 the center of the small hole 168 of attachment plate 148a aligns with the center of the large hole 167 of attachment plate 148b.

Figure 22:
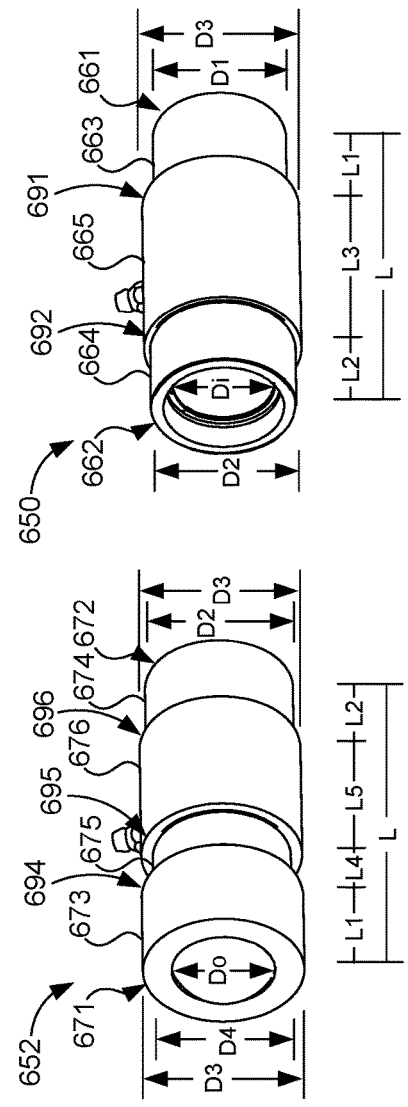
FIG. 22 illustrates views of the first and second tube body of the tube assembly shown in FIG. 21 according to various embodiments of the present disclosure.

An example of the dimensions of the first and second seat tube 650,652 are shown in greater detail in FIG. 22. The exterior surface of first seat tube 650 can have a length L. The first end portion 663 having a length L1 from the first end 661 to a first shoulder 691 and a diameter D1 configured to fit in the small hole 168 of the attachment plate 148. The length L1 can be greater than or equal the thickness of the attachment plate 148. The second end portion 664 of first seat tube 650 can have a length L2 from the second end 662 to a second shoulder 692 and a diameter D2 configured to be received within the interior of the joint connector 654 with a tight fit. The center portion 665 can have a length L3 from the first shoulder 691 to the second shoulder 692 and a diameter D3 configured to be received in the large hole 167 of attachment plate 148.

The exterior surface of the second seat tube 652 can have a length L, which can be the same length L of the first seat tube 650. The first end portion 673 having a length L1 from the first end 671 to a first edge 694 of the recess portion 675. The first end portion 673 of the second seat tube 652 can have a diameter D3 configured to be received in the large hole 167 of attachment plate 148. The length L1 of the second seat tube 652 can be the same as the length L1 of the first seat tube 650. The recess portion 675 can have a length L4 from the first edge 694 to the second edge 695 of the recess portion 675 and having a diameter D4. The central portion 676 can have a length L5 from the second edge 695 to the shoulder 696 and having a diameter D3 configured to be received in the large hole 167 of attachment plate 148. The second end portion 674 can have a length L2 from the shoulder 696 to the second end 672 and a diameter D2 configured to be received within the interior of the joint connector 654. The length L2 and diameter D2 of the second seat tube 652 can be the same as the length L2 and diameter D2 of the first seat tube 650.

Figure 23B:
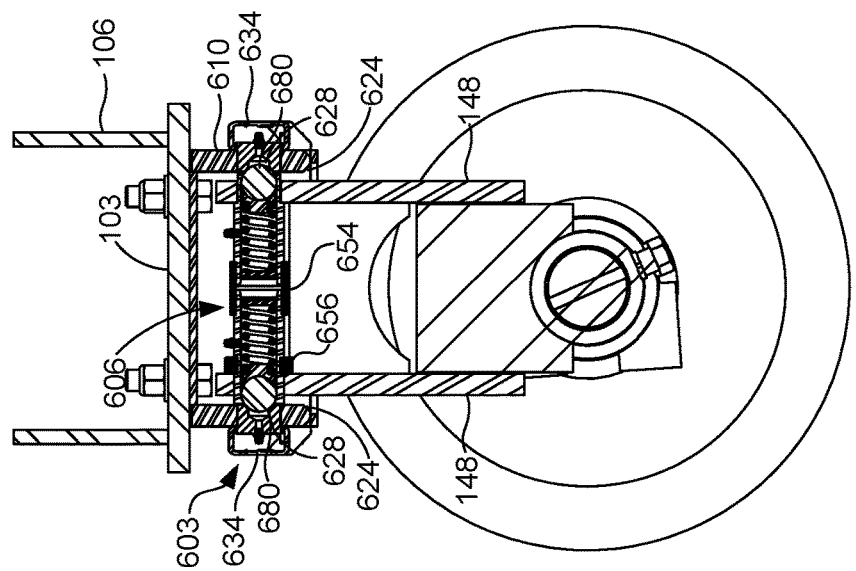
FIGS. 23A-23B illustrate a cross-sectional view of the automatic mechanical lock system with the rear guide wheel assembly in a deployed position (FIG. 23A) and a stowed position (FIG. 23B) according to various embodiments of the present disclosure.
Figure 23A:
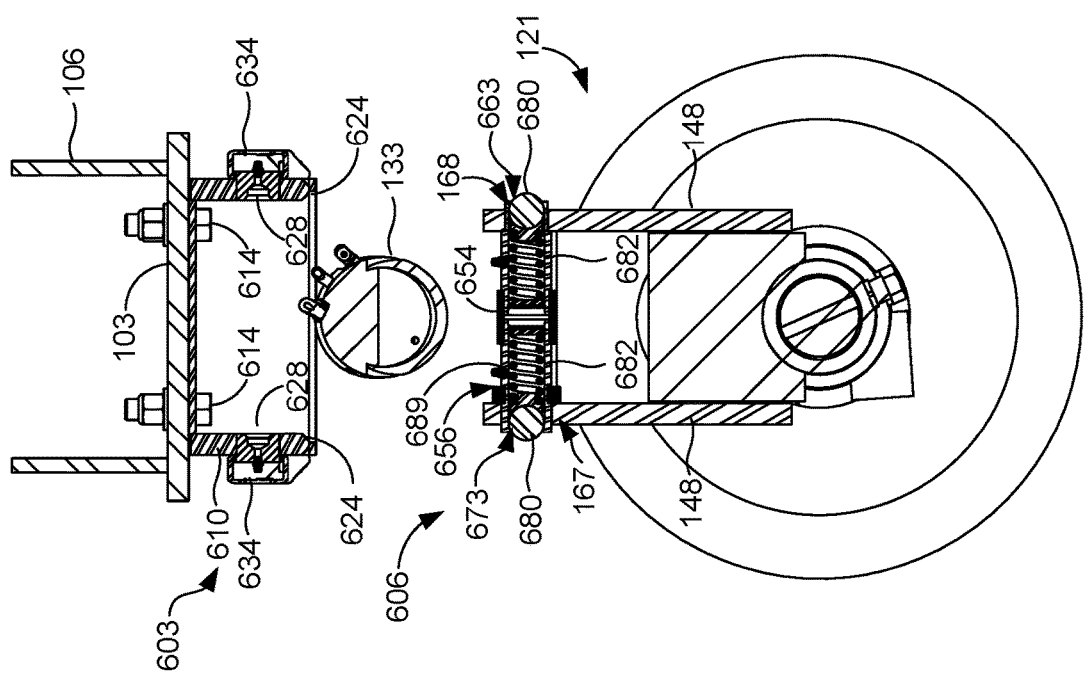

FIGS. 23A-23B illustrate a cross-sectional view of the automatic mechanical lock system 600 with the rear guide wheel assembly 100 shown in FIG. 19. Shown in FIG. 23A, the rear guide wheel assembly 100 is in a deployed position and the automatic mechanical lock system 600 disengaged. As shown, detent box tube 610 can be secured to the rear frame mounting bracket 103. The detent seat 628 of the detent catch 626 on each side of the detent box tube 610 can face each other and be configured to receive the detent 680 of the seat tube assembly 606. In this example, the seat tube assembly 606 can be received into the railgear attachment frame 121 via the large hole 167 on the first attachment plate 148 (left) and protrudes from the small hole 168 of the second attachment plate 148 (right). The seat tube assembly 606 can be secured by shaft collar 656 attached at the recess portion 675 of the second seat tube 652, where the shaft collar 656 abuts the interior surface of the first attachment plate 148 holding the seat tube assembly 606 in place.

Shown in FIG. 23B, the rear guide wheel assembly 100 is in a stowed position and the automatic mechanical lock system 600 engaged. In this stowed position, the detents 680 on both sides of the seat tube assembly 606 engage with the respective detent seat 628 of the detent catch 626 of the detent box weldment 603 to lock the rear guide wheel assembly 100. The chamfered edge 624 of the detent box cap 620 softens the spring 682 engagement as the detent 680 slides into the locking position.

Figure 24A:
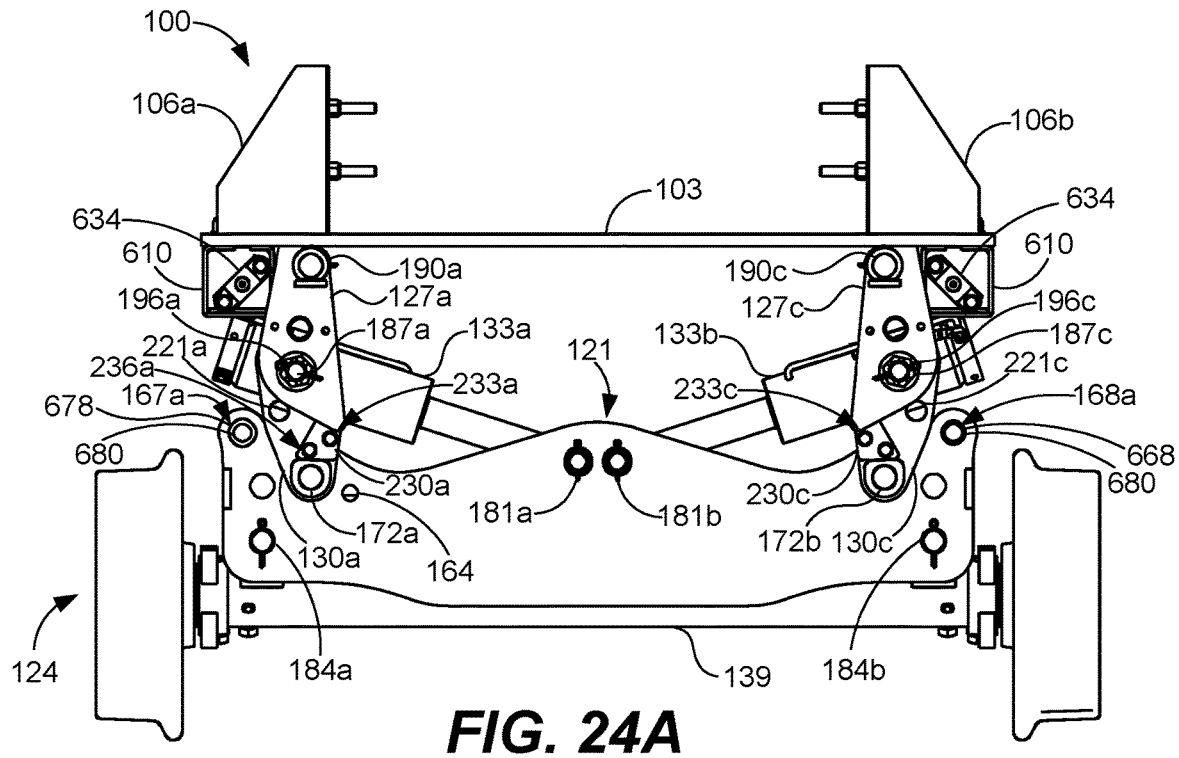
FIGS. 24A-24B illustrate an example rear view of the rear guide wheel assembly with the automatic mechanical lock system shown in FIG. 19 in deployed (FIG. 24A) and stowed (FIG. 24B) positions according to various embodiments of the present disclosure.
Figure 24B:
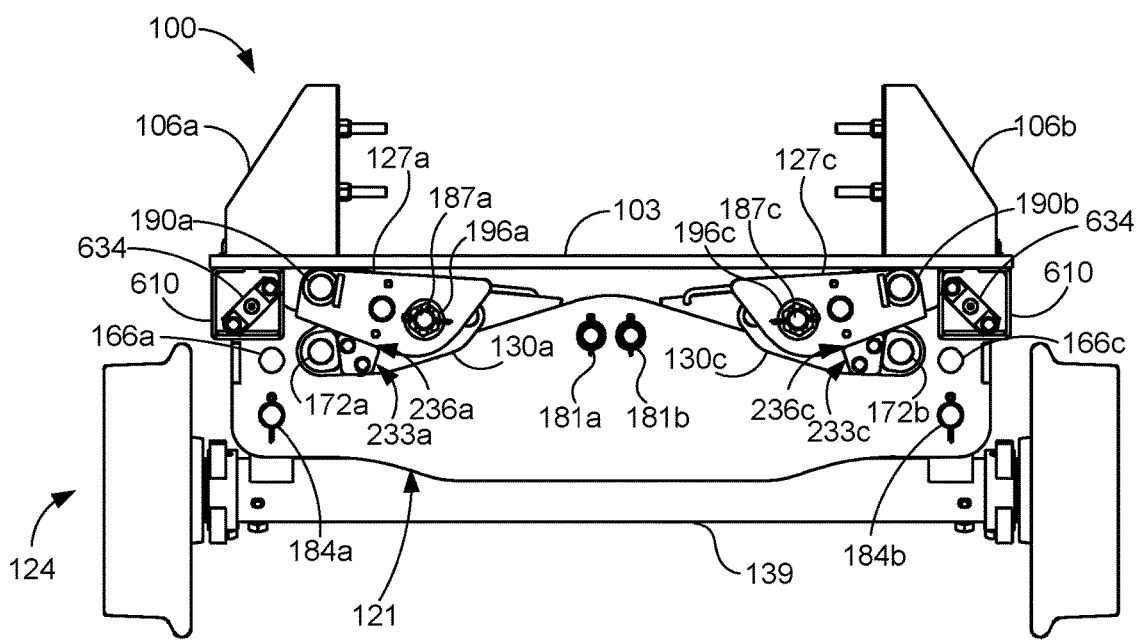

Rear views of the rear guide wheel assembly 100 configured with the automatic mechanical lock system are shown in FIGS. 24A-24B. The positioning of the detent box weldment 603 connected to the rear frame mounting bracket 103 and seat tube assembly 606 connected to railgear attachment frame 121 are shown with respect to each other in the deployed (FIG. 24A) and stowed (FIG. 24B) positions. The detent box weldment 603 does not obstruct the movement between positions. As shown in FIG. 24B, the seat tube assembly 606 connected to the railgear attachment frame 121 is received into the detent box weldment 603 to secure the rear guide wheel assembly 100 in a stowed position.

Figure 25A:
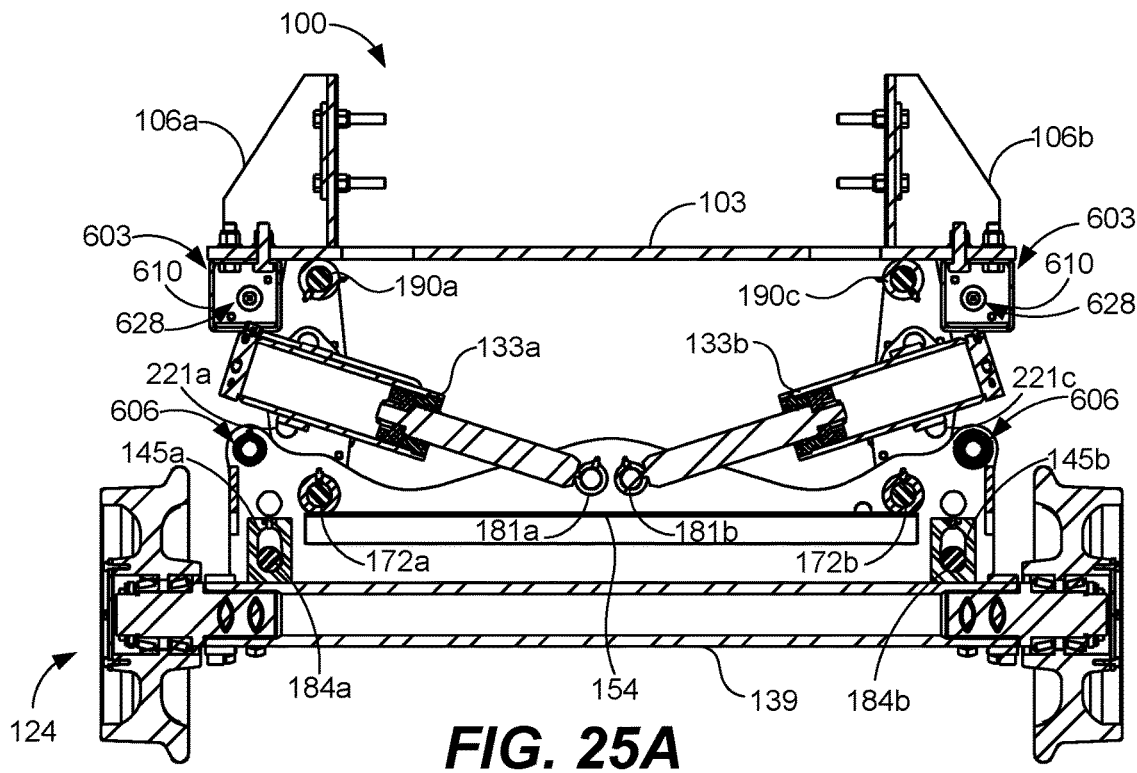
FIGS. 25A-25B illustrate an example cross-sectional view of the rear guide wheel assembly with the automatic mechanical lock system shown in FIG. 19 in deployed (FIG. 25A) and stowed (FIG. 25B) positions according to various embodiments of the present disclosure.
Figure 25B:
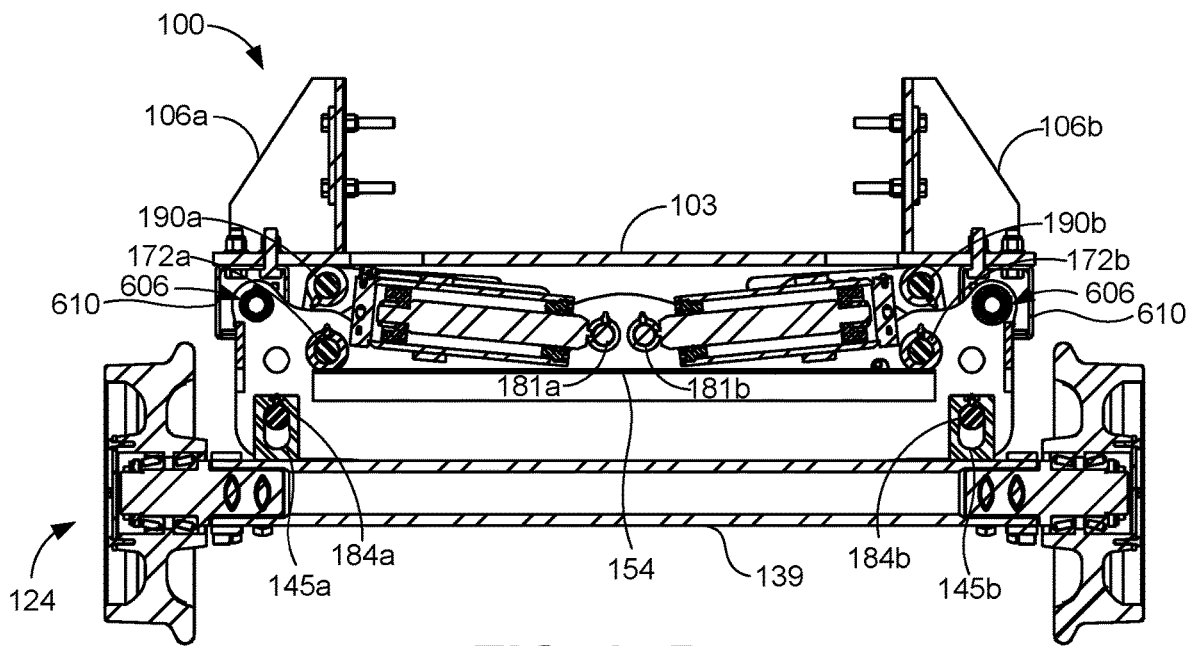

Similarly, FIGS. 25A-25B illustrate an example cross-sectional view of the rear guide wheel assembly 100 with the automatic mechanical lock system 600 in deployed (FIG. 25A) and stowed (FIG. 25B) positions. Shown in FIG. 25A, the position of the detent seat 628 of the detent box weldment 603 is aligned with the position of the seat tube assembly 606 connected to the railgear attachment frame 121 in deployed position. In a stowed position, the seat tube assembly 606 of the railgear attachment frame 121 are received within the detent box weldment 603. Each detent 680 of the seat tube assembly 606 engaged with respective detent seats 628 of the detent box weldments 603 secure the rear guide wheel assembly 100 in a stowed position.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

The invention claimed is:

1. A system, comprising:
   an upper link comprising a mounting hole and an upper link pivot hole, the upper link pivotably connected to a mounting bracket with an upper mounting pin via the mounting hole, the mounting bracket comprising a mounting plate having a top and bottom surface, the mounting bracket configured to be secured to a vehicle; and
   a lower link comprising an attachment hole and a lower link pivot hole, the lower link pivotably connected to a frame comprising an attachment plate, the lower link pivotably connected to the attachment plate of the frame with an attachment pin via the attachment hole of the lower link; and
   an actuator comprising an actuator body and an arm, the arm configured to extend from and recede into the actuator body, the arm comprising an actuator mounting pin at a free end, the actuator body comprising a pivot arm configured to be received in the lower link pivot hole and the upper link pivot hole to pivotably connect the upper link and the lower link, the actuator arm pivotably connected to the attachment plate of the frame via the actuator mounting pin, the actuator configured to move the frame from a first position to a second position relative to the mounting bracket, wherein the upper link rotates about the upper mounting pin from a first position to a second position of the upper link and the lower link rotates about the attachment pin from a first position to a second position of the lower link.

2. The system of claim 1, wherein the upper link comprises a plate with a first and a second facing surface, the plate shaped with a first flat edge configured to abut the bottom surface of the mounting plate when the upper link is in the first position.

3. The system of claim 1, wherein the mounting bracket comprises:
   a mounting tube secured to or into the bottom surface of the mounting plate, the upper link connected to the mounting bracket via the mounting tube.

4. The system of claim 1, wherein the attachment plate comprises an actuator mounting hole and a lower link mounting hole, the actuator mounting hole configured to receive the actuator mounting pin of the actuator arm, the lower link mounting hole configured to receive the attachment pin to pivotably secure the lower link to the frame via the attachment hole of the lower link.

5. The system of claim 4, wherein the attachment plate is a first attachment plate and the frame further comprises a second attachment plate, a first and second side plate, and a bottom plate, wherein the first and second attachment plates are positioned spaced apart in parallel, the first and second side plates are positioned in parallel at opposite ends of the first and second attachment plates forming walls of the frame.

6. The system of claim 1, wherein the upper link is a first upper link and the lower link is a first lower link, wherein the pivot arm of the actuator is a first pivot arm, and the actuator body further comprises a second pivot arm, the first and second pivot arms extending in opposing directions on a first and second side of the actuator, the system further comprising:
   a second lower link, wherein the first and second lower links are pivotably mounted on the first and second pivot arms of the actuator, respectively; and
   a second upper link, wherein the first and second upper links are mounted on the first and second pivot arms of the actuator positioned such that the first and second lower links are between the first and second upper links and the actuator.

7. A system, comprising:
   an upper link comprising a mounting hole and an upper link pivot hole, the upper link pivotably connected to a mounting bracket with an upper mounting pin via the mounting hole, the mounting bracket comprising a mounting plate having a top and bottom surface, the mounting bracket configured to be secured to a vehicle; and
   a lower link comprising an attachment hole and a lower link pivot hole, the lower link pivotably connected to a frame with an attachment pin via the attachment hole, wherein the lower link comprises a stop mounted on a first facing surface of the lower link, the stop comprising:
      a first position stop surface configured to engage a second flat edge of the upper link to stop movement of the upper link when the upper link is in the first position;
      a second position stop surface configured to engage a third flat edge of the upper link when the upper link is in the second position; and
      a rotation stop surface configured to abut a surface of the attachment pin extending outwardly from the attachment hole of the lower link; and
   an actuator comprising an actuator body and an arm, the arm configured to extend from and recede into the actuator body, the arm comprising an actuator mounting pin at a free end, the actuator body comprising a pivot arm configured to be received in the lower link pivot hole and the upper link pivot hole to pivotably connect the upper link and the lower link, the actuator arm pivotably connected to the frame via the actuator mounting pin, the actuator configured to move the frame from a first position to a second position relative to the mounting bracket, wherein the upper link rotates about the upper mounting pin from a first position to a second position of the upper link and the lower link rotates about the attachment pin from a first position to a second position of the lower link.

8. A system, comprising
   an upper link comprising a mounting hole and an upper link pivot hole, the upper link pivotably connected to a mounting bracket with an upper mounting pin via the mounting hole, the mounting bracket comprising a mounting plate having a top and bottom surface, the mounting bracket configured to be secured to a vehicle; and
   a lower link comprising an attachment hole and a lower link pivot hole, the lower link pivotably connected to a frame with an attachment pin via the attachment hole;
   an actuator comprising an actuator body and an arm, the arm configured to extend from and recede into the actuator body, the arm comprising an actuator mounting pin at a free end, the actuator body comprising a pivot arm configured to be received in the lower link pivot hole and the upper link pivot hole to pivotably connect the upper link and the lower link, the actuator arm pivotably connected to the frame via the actuator mounting pin, the actuator configured to move the frame from a first position to a second position relative to the mounting bracket, wherein the upper link rotates about the upper mounting pin from a first position to a second position of the upper link and the lower link rotates about the attachment pin from a first position to a second position of the lower link; and an automatic mechanical lock, the automatic mechanical lock comprising an upper lock device and a lower lock device, the upper lock device attached to the bottom surface of the mounting plate, the lower lock device attached to the frame, the upper lock device configured to receive the lower lock device and at least a portion of the frame.

9. A rear guide wheel assembly, comprising:
a railgear comprising a pair of guidewheels, an axle, and a first and a second axle saddle block attached at opposite ends of the axle;
an attachment frame comprising a first and second attachment plate, the attachment frame configured to connect to the axle saddle blocks of the railgear;
a mounting bracket configured to attach to a vehicle;
a plurality of upper links pivotably connected to the mounting bracket;
a plurality of lower links pivotably connected to the attachment frame, a portion of the plurality of lower links connected to the first attachment plate, another portion of the plurality of lower links connected to the second attachment plate; and
at least two independent actuators configured to facilitate movement of the railgear between a deployed position and stowed position, each actuator having a pair of pivot arms extending in opposing directions, said lower links connected to said upper links via said pivot arms, each actuator having an actuator arm pivotably connected to the first and second attachment plate of the attachment frame.

10. The rear guide wheel assembly of claim 9, wherein the mounting bracket comprises a mounting plate, a first and second mounting tube, and a first and second support plate, the mounting plate comprising a top and bottom surface, the first mounting tube attached to the bottom surface at a first end portion of the mounting plate, the second mounting tube attached to the bottom surface at a second end portion of the mounting plate, and the first support plate attached to the top surface of the mounting plate spaced apart from and facing the second support plate, the first and second support plates configured to receive fasteners to secure the rear guide wheel assembly to the vehicle.

11. The rear guide wheel assembly of claim 10, wherein:
each attachment plate of the attachment frame has a set of first and second position holes aligned vertically at opposite end portions of each attachment plate,
each axle saddle block has a saddle hole which extends through said axle saddle block, the saddle hole configured to receive a positioning pin to connect the railgear to the attachment frame through the set of first position holes or the set of second positions holes.

12. The rear guide wheel assembly of claim 9, wherein the attachment frame further comprises a first and second side plate, and a bottom plate, wherein the first and second attachment plates are positioned spaced apart in parallel, the first and second side plates are positioned in parallel at opposite ends of the first and second attachment plates forming walls of the attachment frame, wherein the attachment frame is configured fit over the first and second axle saddle blocks.

13. The rear guide wheel assembly of claim 9, wherein the at least two independent actuators comprise a first and a second actuator, wherein the first actuator actuates at a first speed and the second actuator actuates at a second speed such that the railgear is configured to be shifted off-center between the first and second position and is configured to be centered when reaching the second position.

14. A rear guide wheel assembly, comprising:
a railgear comprising a pair of guidewheels, an axle, and a first and a second axle saddle block attached at opposite ends of the axle;
an attachment frame configured to connect to the axle saddle blocks of the railgear;
a mounting bracket configured to attach to a vehicle;
a plurality of upper links pivotably connected to the mounting bracket;
a plurality of lower links pivotably connected to the attachment frame; and
at least two independent actuators configured to facilitate movement of the railgear between a deployed position and stowed position, each actuator having a pair of pivot arms extending in opposing directions, said lower links connected to said upper links via said pivot arms; and
wherein each upper link comprises a plate with a first and a second facing surface, the plate shaped with a first flat edge configured to abut a bottom surface of the mounting bracket when the upper link is in the first position, wherein the lower link further comprises a stop mounted on a first facing surface of the lower link, the stop comprising:
a first position stop surface configured to engage a second flat edge of the upper link to stop movement of the upper link when the upper link is in the first position;
a second position stop surface engage a third flat edge of the upper link when the upper link is in the second position; and
a rotation stop surface configured to abut a surface of the attachment pin extending from the attachment pin positioned in an attachment hole of the lower link.

15. A rear guide wheel assembly, comprising:
a railgear comprising a pair of guidewheels, an axle, and a first and a second axle saddle block attached at opposite ends of the axle;
an attachment frame configured to connect to the axle saddle blocks of the railgear;
a mounting bracket configured to attach to a vehicle;
a plurality of upper links pivotably connected to the mounting bracket;
a plurality of lower links pivotably connected to the attachment frame; and
at least two independent actuators configured to facilitate movement of the railgear between a deployed position and stowed position, each actuator having a pair of pivot arms extending in opposing directions, said lower links connected to said upper links via said pivot arms; and
an upper locking device attached to the mounting bracket, the upper locking device comprising:

a detent box tube comprising a plurality of side walls and a first and second box cap positioned at a first and second end of the detent box tube, each of the first and second box cap comprising a center aperture configured to receive a detent catch, the detent catch comprising a detent head and a detent seat, the detent catch positioned in the center aperture of each of the first and second box cap such that the detent seat faces an interior of the detent box tube and the detent catch is secured at the detent head on an exterior surface of each of the first and second detent box caps with an anti-rotation plate, the detent seats of attached to the first and second detent box cap are positioned facing each other; and a lower locking device is attached to the frame, the lower locking device comprising:

a first seat tube comprising a first end portion with a first diameter and a second end portion with a second diameter, the first seat tube being hollow and configured to contain at least a first detent and a first spring, the spring configured to apply pressure to the first detent such that the first detent protrudes from a first tube rim in a first end of the first seat tube;

a second seat tube comprising a first end portion with a third diameter and a second end portion with the second diameter, the second seat tube being hollow and configured to contain at least a second detent and a second spring, the second spring configured to apply pressure to the second detent such that the second detent protrudes from a second tube rim in a first end of the second seat tube;

a joint connector having an interior diameter configured to receive the second end portion of the first seat tube and the second end portion of the second seat tube; and a shaft collar, wherein the attachment frame includes a first and a second attachment plate, each of the first and second attachment plates having an interior and exterior surface, each of the first and second attachment plates comprise a large hole and a small hole; the first attachment plate arranged parallel to the second attachment plate such that the interior surfaces are facing each other and the large hole on the first attachment plate is aligned with the small hole of the second attachment plate, and wherein the lower locking device is configured to be received in the attachment frame such that the first portion of the first seat tube passes through the large hole of the first attachment plate to be seated from the interior in the small hole of the second attachment plate and the first end portion of the second seat tube is seated in the large hole of the first attachment plate, the lower locking device secured in position by the shaft collar.

* * * * *